US009529228B2

(12) United States Patent
Banin et al.

(10) Patent No.: US 9,529,228 B2
(45) Date of Patent: Dec. 27, 2016

(54) POLARIZING LIGHTING SYSTEMS

(75) Inventors: Uri Banin, Mevasseret Zion (IL);
Hagai Arbell, Jerusalem (IL)

(73) Assignees: YISSUM RESEARCH DEVELOPMENT COMPANY OF THE HEBREW UNIVERSITY OF JERUSALEM, LTD., Jerusalem (IL);
QLIGHT NANOTECH LTD., Jerusalem (IL)

( * ) Notice: Subject to any disclaimer, the term of this patent is extended or adjusted under 35 U.S.C. 154(b) by 517 days.

(21) Appl. No.: 13/883,701

(22) PCT Filed: Nov. 6, 2011

(86) PCT No.: PCT/IL2011/050005
§ 371 (c)(1),
(2), (4) Date: Sep. 20, 2013

(87) PCT Pub. No.: WO2012/059931
PCT Pub. Date: May 10, 2012

(65) Prior Publication Data
US 2014/0009902 A1    Jan. 9, 2014

Related U.S. Application Data

(60) Provisional application No. 61/410,362, filed on Nov. 5, 2010.

(51) Int. Cl.
*F21V 9/16* (2006.01)
*F21V 9/14* (2006.01)
*G02F 1/1335* (2006.01)

(52) U.S. Cl.
CPC ......... *G02F 1/1336* (2013.01); *G02F 1/13362* (2013.01); *G02F 1/133617* (2013.01);
(Continued)

(58) Field of Classification Search
CPC ............ G02F 1/133617; G02F 1/13362; G02F 1/1336; G02F 1/133621; G02F 2001/133614; G02F 2202/36; G02F 2203/34
(Continued)

(56) References Cited

U.S. PATENT DOCUMENTS 5,537,000 A    7/1996   Alivisatos et al.
6,939,604 B1   9/2005   Guyot-Sionnest et al.
(Continued)

FOREIGN PATENT DOCUMENTS

CN    1825191 A    8/2006
CN    1957511 A    5/2007
(Continued)

OTHER PUBLICATIONS

Ge et al. "Nanowire grid polarizer for energy efficient and wide-view liquid crystal displays.", Applied Physics Letters, 93, 121104 (2008).
(Continued)

*Primary Examiner* — Anh Mai
*Assistant Examiner* — Glenn Zimmerman
(74) *Attorney, Agent, or Firm* — Browdy and Neimark, PLLC

(57) ABSTRACT

An optically active structure (100) is provided, comprising at least two different groups (G1, G2) of optically active nanorods (104A, 104B). The groups of nanorods differ from one another in at least one of wavelength and polarization of light emitted thereby in response to pumping light. The nanorods of the same group are homogeneously aligned with a certain axis of alignment being substantially parallel or substantially perpendicular to an axis of alignment of the nanorods of at least one other group, such that the nanorods of said at least two groups have one or two axes of
(Continued)

alignment. The optically active structure is used as color polarized light source for displays.

32 Claims, 12 Drawing Sheets

(52) U.S. Cl.
CPC .............. *G02F 1/133621* (2013.01); *G02F 2001/133614* (2013.01); *G02F 2202/36* (2013.01); *G02F 2203/34* (2013.01)

(58) Field of Classification Search
USPC .................................. 362/19, 97, 97.1, 97.2
See application file for complete search history.

(56) References Cited

U.S. PATENT DOCUMENTS

| | | | |
|---|---|---|---|
| 7,200,318 B2 | 4/2007 | Banin et al. | |
| 7,405,825 B2 | 7/2008 | Schuurmans et al. | |
| 7,440,166 B2 | 10/2008 | Burov et al. | |
| 8,259,258 B2 | 9/2012 | Gorog et al. | |
| 2002/0008807 A1* | 1/2002 | Miyatake | G02B 5/3016 349/65 |
| 2003/0180640 A1* | 9/2003 | Darty | B82Y 10/00 430/31 |
| 2004/0095658 A1* | 5/2004 | Buretea | B82Y 20/00 359/853 |
| 2005/0174028 A1 | 8/2005 | Jung et al. | |
| 2006/0258028 A1 | 11/2006 | Paolini et al. | |
| 2007/0284544 A1 | 12/2007 | Ishihara et al. | |
| 2008/0084706 A1* | 4/2008 | Roshan et al. | 362/601 |
| 2008/0088225 A1 | 4/2008 | Weiss et al. | |
| 2008/0111145 A1* | 5/2008 | Lin | 257/98 |
| 2008/0128761 A1 | 6/2008 | Banin et al. | |
| 2008/0204383 A1 | 8/2008 | McCarthy et al. | |
| 2009/0046222 A1 | 2/2009 | Miner et al. | |
| 2009/0162011 A1 | 6/2009 | Coe-Sullivan et al. | |
| 2009/0230382 A1 | 9/2009 | Banin et al. | |
| 2010/0110728 A1 | 5/2010 | Dubrow et al. | |
| 2010/0155749 A1 | 6/2010 | Chen et al. | |
| 2010/0202272 A1 | 8/2010 | Kim et al. | |
| 2011/0254042 A1* | 10/2011 | Shaikevitch | 257/98 |

FOREIGN PATENT DOCUMENTS

| | | |
|---|---|---|
| CN | 101479653 A | 7/2009 |
| EP | 1909134 A2 | 4/2008 |
| EP | 2262271 A1 | 12/2010 |
| JP | 2010-525597 A | 7/2010 |
| JP | 2010-186533 A | 8/2010 |
| WO | 2005075339 A2 | 8/2005 |
| WO | 2006134599 A1 | 12/2006 |
| WO | 2008/132455 A1 | 11/2008 |
| WO | 2010/095140 A2 | 8/2010 |
| WO | 2011092646 A2 | 8/2011 |
| WO | 2012/035535 A1 | 3/2012 |

OTHER PUBLICATIONS

X. Peng et al., "Shape control of CdSe nanocrystals", Nature 404, 59-61 (2000).
Mokari et al. "Synthesis and properties of CdSe/ZnS rod/shell nanocrystals", Chemistry of Materials 15(20), 3955-3960 (2003).
Talapin, et al, "Seeded Growth of Highly Luminescent CdSe/CdS Nanoheterostructures with Rod and Tetrapod Morphologies", Nano Letters 7(10), pp. 2951-2959 (2007).
C. Carbone et al, "Synthesis and Micrometer-Scale Assembly of Colloidal CdSe/CdS Nanorods Prepared by a Seeded Growth Approach". Nano Letters, 7(10), pp. 2942-2950 (2007).
Rizzo et al: "Polarized Light Emitting Diode by Long-Range Nanorod Self-Assembling on a Water Surface", ACS NANO, vol. 3, No. 6, 23:1506-1512 (2009).
J. Hu: "Linearly Polarized Emission from Colloidal Semiconductor Quantum Rods", Science, vol. 292, No. 5524, 15, pp. 2060-2063 (2001).
Kazes, et al."Lasing from Semiconductor Quantum Rods in Cylindrical Microcavity", Advanced. Materials, 14(4): 317-321. (2002).
Eli Rothenberg, et. al. "Electric Field Induced Switching of the Fluorescence of Single Semiconductor Quantum Rods", Nano Letters, 5(8), 1581-1586 (2005).
Wing-Keung Woo, et al. "Reversible Charging of CdSe Nanocrystals in a Simple Solid-State Device", Advanced Materials, 14(15): 1068-1071 (2002).
Yorai Amit et al: "Semiconductor nanorod layers aligned through mechanical rubbing", Phys. Status Solidi A 209, No. 2, pp. 235-242 (2012).

* cited by examiner

POLARIZING LIGHTING SYSTEMS

FIELD OF THE INVENTION

This invention is generally in the field of polarizing lighting systems, and relates to optically pumped polarizing lighting systems, which are particularly useful as backlight systems for displays.

BACKGROUND OF THE INVENTION

Polarization properties of light are used in a variety of optical applications (products and methods) ranging from flat panel liquid-crystal displays (LCDs) to microscopy, metallurgy inspection and optical communication. Light generated by most light sources does not have a specific polarization, and typical polarization selection is done using polarizers of various types. The selection of a particular polarization using a polarizer comes at the cost of energy loss; approximately 50% of impinging light may be lost when using a simple passive (non-emissive) polarizer to provide polarized illumination using a non-polarized light source. This problem is of particular significance in backlight systems for LCD displays, where energy saving is an important factor. The problem is further intensified in mobile devices (laptops, cellphones, cameras, etc.) where battery life is a crucial factor.

Relatively efficient polarization selection of light emitted by an unpolarized light source can be achieved by locating complex passive (non-emissive) polymer films with special surfaces in the optical path of the emitted light. These films may recycle some of the light and thus enhance the transmission of light of the desired polarization. Recycling of light is based on reflecting light components of unwanted polarization onto a reflecting surface, thereby producing multiply reflected light components which depolarize after subsequent reflections, and thus at least some light components are transmitted after each reflection. However, such passive systems are complex and expensive to produce, as multiple (even tens) of layers are required for efficient recycling. Another "passive" approach to recycling a backlight output through a polarizer uses a reflective nanowire grid polarizer (Ge, Zhibing and Wu, Shin-Tson. "Nanowire grid polarizer for energy efficient and wide-view liquid crystal displays.", Applied Physics Letters, 93, 121104, 2008).

Passive approaches as described above complicate the design of a backlight system and are expensive. They are also inactive in enhancing the quality of the color gamut of the emitted light, because they are wavelength dependent. In fact, the need to preserve the color gamut of the original backlight complicates further the layer structure of backlight system.

Anisotropic (elongated) nanoparticles such as nanorods (also at times referred to herein as "rods") are known as being capable of providing polarized emission. This is also described in WO 2010/095140 assigned to the assignee of the present application.

Some nanorod systems providing polarized emission are described in the following publications:

X. Peng et al., "Shape control of CdSe nanocrystals", Nature 404, 59-61, 2000 describes colloidal based semiconductor core (without shell) CdSe nanorods embedded in a polymer. Nearly full polarization can be obtained from single rods.

T. Mokari and U. Banin, "Synthesis and properties of CdSe/ZnS rod/shell nanocrystals", Chemistry of Materials 15 (20), 3955-3960, 2003 describes the emission enhancement of rods by growing a shell on the rod structure.

D. V. Talapin, et al, "Seeded Growth of Highly Luminescent CdSe/CdS Nanoheterostructures with Rod and Tetrapod Morphologies", Nano Letters 7 (10), pp 2951-2959, 2007 describes a quantum yield improvement achieved for seeded nanorod particles.

C. Carbone et al, "Synthesis and Micrometer-Scale Assembly of Colloidal CdSe/CdS Nanorods Prepared by a Seeded Growth Approach". Nano Letters, 7 (10), pp 2942-2950, 2007 describes a dipole pattern emission of seeded rods, i.e. emission emanating from the rod center rather than its tips.

GENERAL DESCRIPTION

There is a need in the art for a novel approach in polarized light sources enabling their effective use in various applications, i.e. energy efficient lighting, such as backlighting for displays, especially color displays, as well as displays with a 3D feature.

Embodiments of the invention provide designs for energy efficient polarized backlight and display systems using in general colloidal anistropic nanoparticles and in particular colloidal nanorods with strong polarized emission. Such systems employ an active (meaning emissive) layer or film containing aligned anistropic nanorod which converts non-polarized light from a back light source into partially or fully polarized light. This layer or film is referred to hereinafter as "optically active structure" or at times "Active Polarized light Emissive Layer" or APEL. It should be noted that the optically active structure (or APEL) of the present invention may be utilized with polarized pumping illumination, as well as with non-polarized pumping illumination, to emit polarized or partially polarized light.

According to one broad aspect of the invention, there is provided an optically active structure comprising at least two groups of optically active nanorods differing from one another in at least one of wavelength and polarization of light emitted thereby in response to pumping light, an arrangement of said nanorods of said at least two groups defining one or two axes of alignment, such that the nanorods of the same group are homogeneously oriented with an axis of alignment being substantially parallel or substantially perpendicular to an axis of alignment of the nanorods of at least one other group.

Certain embodiments of the invention provide an optically active structure which includes anisotropic nanoparticles. In some embodiments, the optically active structure is a layer of anisotropic nanoparticles positioned on a substrate. In some embodiments, the optically active structure includes anisotropic nanoparticles embedded in a medium. In some embodiments, the medium may be a polymeric medium or a glass medium prepared e.g. by a sol-gel process. In some embodiments, the anisotropic particles are aligned in the medium with their long axis along an alignment axis. The alignment may be induced by stretching the medium and without use of any electrical field. In some embodiments, the alignment may be partial. In other embodiments, the alignment may be full. In some embodiments with aligned anisotropic nanoparticles, the anisotropic nanoparticles are excited by incoming optical radiation to emit polarized light. The nanoparticles are excited without any use of an electric field. The polarization of the emitted light may be partial or full and is generally in the direction of the long axis of the nanoparticles. The excitation of the anisotropic nanoparticles and the resultant polarized emission of light are caused solely by the optical radiation.

In some embodiments, the structure comprises nanorods which emit light of substantially the same wavelength and are oriented along the two perpendicular axes of alignment thereby producing light of orthogonal polarizations.

The structure may comprise at least one region thereof which contains a mixture of the homogeneously aligned nanorods of the at least two groups emitting light of at least two different wavelengths respectively.

The structure may comprise at least one pair of spaced-apart regions, containing the nanorods of the two groups respectively, or generally an array of regions arranged along at least one axis in a spaced-apart relationship, where each two adjacent regions aligned along said at least one axis contain the nanorods of the different groups. The structure may have a cascaded arrangement, i.e. may comprise at least two layers spaced apart along an axis of a direction of propagation of the pumping light, where the at least two groups of optically active nanorods emitting light of the at least two different wavelengths are located in the at least two different layers, respectively. In this embodiment, the at least two groups of nanorods may be arranged in said at least two layers such that the nanorods emitting light of relatively shorter wavelength of said at least two wavelengths of emitted light are located downstream of the nanorods emitting light of relatively longer wavelength, with respect to a direction of propagation of the pumping light.

The nanorods may be arranged in at least one film, being either deposited on a substrate carrier (e.g. glass substrate) or being in the form of a matrix or carrier with nanorods embedded therein. In any case, the carrier is optically transparent or partially transparent for the pumping light and emitted light.

The nanorods may be made of one or more semiconductor materials, and have a suitable elongated geometry, e.g. with an aspect ratio of at least 1.8. The nanorods may have a core-shell configuration and/or configured as seeded rods with a spherical or rod-like seed.

In certain embodiments, the optically active structure is included in a backlight system, for example a backlight for a display. In such systems, the optically active structure is excited by a light source (also referred to as "excitation source"). In some embodiments, the light source provides short wavelength light which is absorbed by the anisotropic nanoparticles in the optically active structure. The excitation source may include for example light emitting diodes (LEDs). For a back light in the visible range, some excitation sources may emit light below 480 nm, for example in the blue region such as around 460 nm or in the violet region such as around 405 nm. Other excitation sources may emit light in the ultraviolet (UV) region (below 400 nm and preferably around 360 nm). Yet other excitation sources may emit blue-UV light, for example cold-cathode fluorescent light (CCFL) sources which are not coated by a phosphor layer. Therefore, the optically active structure can emit polarized light in different colors to be displayed on a display, depending on the emission color of the anistropic nanoparticles. In some embodiments, the excitation source emits light toward one broad surface of the optically active structure. In some embodiments, the excitation source emits light toward a narrow side (cross section) of the optically active structure, in a so called "waveguide" configuration. In some embodiments, part of the light emitted by the excitation source is transmitted through the optically active structure without interacting with the nanoparticles, and may be used directly in a display device to provide an additional non-polarized color.

In some embodiments of a backlight display system, at least two different optically active structures may be used to provide respectively polarized light with different colors. In some embodiments, a single optically active structure may include different types of anisotropic nanoparticles, optically excitable to emit polarized light of different colors. In some embodiments, an optically active structure may be in the form of a stripe, with rectangular or polygon-like shape. Different optically active structures in the form of stripes, or any other form, may be assembled into a single layer comprising pixels (or pixel-like) arrangement. A single layer with different optically active stripes/pixels may therefore provide polarized light with different colors, or provide two orthogonal polarizations in a repeated stripe/pixel arrangement. In some embodiments, the polarization of the light emitted from the optically active structure is linear. In other embodiments, the linear polarization may be converted into circular polarization.

Nanorods are well suited to application in backlighting for LCD display devices. A film consisting of aligned nanorods, according to the present invention, can be incorporated in any type of LC based display/projection system. The nanorods containing film is illuminated by a pumping light (typically non-polarized, but polarized or partially polarized pumping light may be used as well) which causes the nanorods to emit substantially polarized light at the desired wavelengths. The light obtained from aligned nanorods based lighting device carries significant advantages with respect to color quality, contrast, efficiency, and degree of polarization as will be described further below. As noted the polarization qualities can obviate the need for expensive DBEF layers. In addition there may be a gain in directionality (in at least one axis) over films comprised of QD's which may result in higher efficiency of the lighting device. Thus a nanorods containing layer can also replace a BEF layer designed for brightness enhancement purposes. However, BEF layers, reflectors, or other optical components may be utilized in the path of the light emitted from such a nanorods containing/embedding film, i.e. between the film and the LC panel/structure, in order to provide further desired directionality, focusing and brightness enhancement.

In this description, a light conversion/emitting layer/structure is at times referred to as "film". The film may include various light extracting features on one or both surfaces (such as prisms, pyramids, microlens etc. . . . ). According to the invention, the light extracting features are preferably configured to preserve polarization of light emitted from the film, such as microlens (or microlens array), metallic reflecting surface, etc. The film may also have various refraction index structures/interfaces that can also assist in the light extraction and polarization preservation (e.g. gradient-index lens-like structures). Polarization preserving diffuser film can be attached to the APEL from one or more sides. The film can also include various combinations of light dispersing particles of regular and non regular shape that may enhance the polarization properties. It should be understood that the term "film" should be interpreted broadly covering also layers of any other geometry, e.g. of close packed structures, that can provide same polarization and light conversion function such as close packed arrangement of balls, rods, woven fabric of wires and so on.

According to another broad aspect of the invention, there is provided a lighting device comprising an optically active structure comprising at least two groups of optically active nanorods differing from one another in at least one of wavelength and polarization of light emitted thereby in response to pumping light, an arrangement of said nanorods of said at least two groups defining one or two axes of orientation, such that the nanorods of the same group are homogeneously oriented with an axis of orientation being substantially parallel or substantially perpendicular to an axis of orientation of the nanorods of at least one other group.

The optically active structure of the present invention emits light in multiple directions substantially within a plane perpendicular to the axis on alignment of nanorods (which is the longer axis of the nanorods). The lighting device of the invention utilizing such structure(s) is preferably configured to propagation of the emitted light with a certain general direction of propagation. To this end, a lighting device may comprise at least one light deflecting surface and/or at least one refracting surface located in an optical path of the light emitted by the optically active structure for directing emitted light in said general direction of light propagation.

According to yet another broad aspect of the invention, there is provided an optically active structure comprising two groups of optically active nanorods, the nanorods of the same group being homogeneously aligned with an axis of alignment being substantially perpendicular to an axis of alignment of the nanorods of the other group, thereby emitting orthogonally polarized light.

The nanorods may comprise nanorods emitting light of two or more different wavelengths. The optically active structure may comprise at least one pair of spaced-apart regions containing the nanorods of the two groups oriented with substantially perpendicular axes of orientation thereof. In some embodiments, the optically active structure comprises an array of regions arranged in a spaced-apart relationship along at least one axis, each two adjacent regions along at least one axis containing the nanorods of the two groups oriented with substantially perpendicular axes of orientation thereof. The configuration may be such that each two adjacent regions, arranged in the spaced-apart relationship along at least one axis, contain the nanorods of the two groups emitting light of two different wavelengths. The optically active structure may comprise at least one region thereof which contains a mixture of the nanorods of said at least two groups emitting light of the at least two different wavelengths.

The optically active structure may be of a cascaded arrangement. At least two groups of optically active nanorods comprise nanorods emitting light of at least two different wavelengths in response to pumping light, and the nanorods emitting light of the at least two different wavelengths are located in at least two different planes, respectively. The at least two different planes may be arranged in a spaced-apart relationship along an axis of propagation of the pumping light. The at least two groups of nanorods may be arranged in the at least two planes such that the nanorods emitting light of relatively longer wavelength of said at least two wavelengths of emitted light are located downstream of the nanorods emitting light of relatively shorter wavelength, with respect to a direction of propagation of the pumping light towards the optically active structure.

According to yet further aspect of the invention, there is provided an optically active structure comprising at least two groups of optically active nanorods differing from one another in a wavelength of light emitted thereby in response to pumping light, the optically active nanorods comprising a plurality of nanorods homogeneously oriented along an axis of alignment thereby emitting substantially polarized light in response to said pumping light.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1B exemplifies the optically active structure in which two different groups of nanorods are located in different regions, and FIG. 1C exemplifies a cascaded configuration of the optically active structure comprising different groups of nanorods;

FIGS. 2A and 2B illustrate pumping and output lighting scheme, FIGS. 2C and 2D exemplify how the optically active nanorods can be distributed within the optically active structure;

FIG. 5A shows a lighting device/unit optically pumped by a side-mounted LED, and configured to provide a combination of collimated and focusing illumination; FIG. 5B shows a lighting unit optically pumped by a rear-mounted LED; and FIG. 5C shows a lighting unit with an alternate design for rear optical pumping and configured to provide collimated or partially collimated illumination;

DETAILED DESCRIPTION OF EMBODIMENTS

Figure 1A:
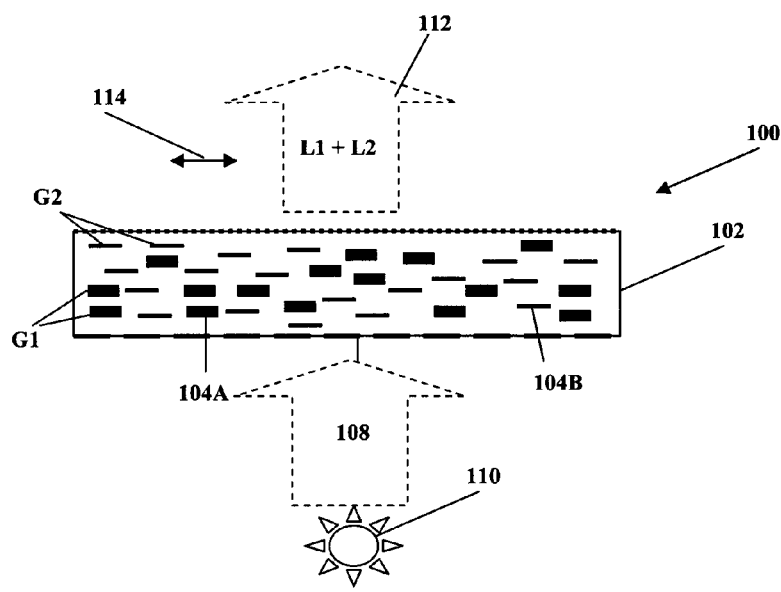
FIGS. 1A to 1C schematically illustrate three examples, respectively, of an optically active structure of the present invention for use in a lighting device such as backlight source for displays or any other device utilizing spatial light modulators, where FIG. 1A exemplifies the optically active structure in which nanorods of two different groups are mixed (located within the same region)
Figure 1B:
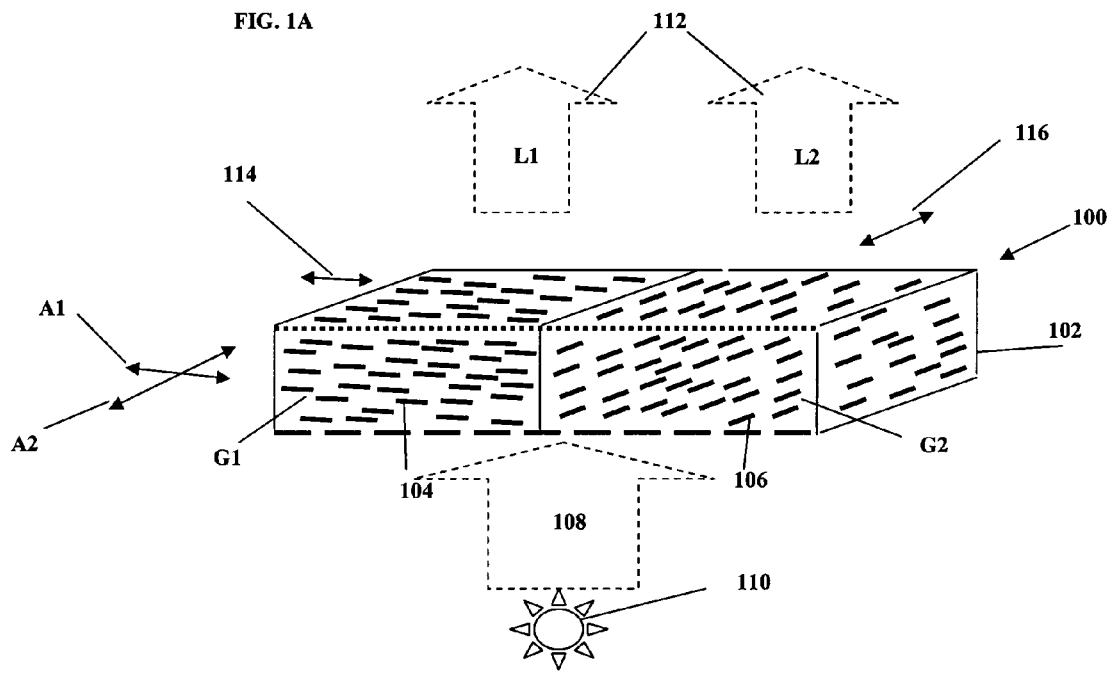
Figure 1C:
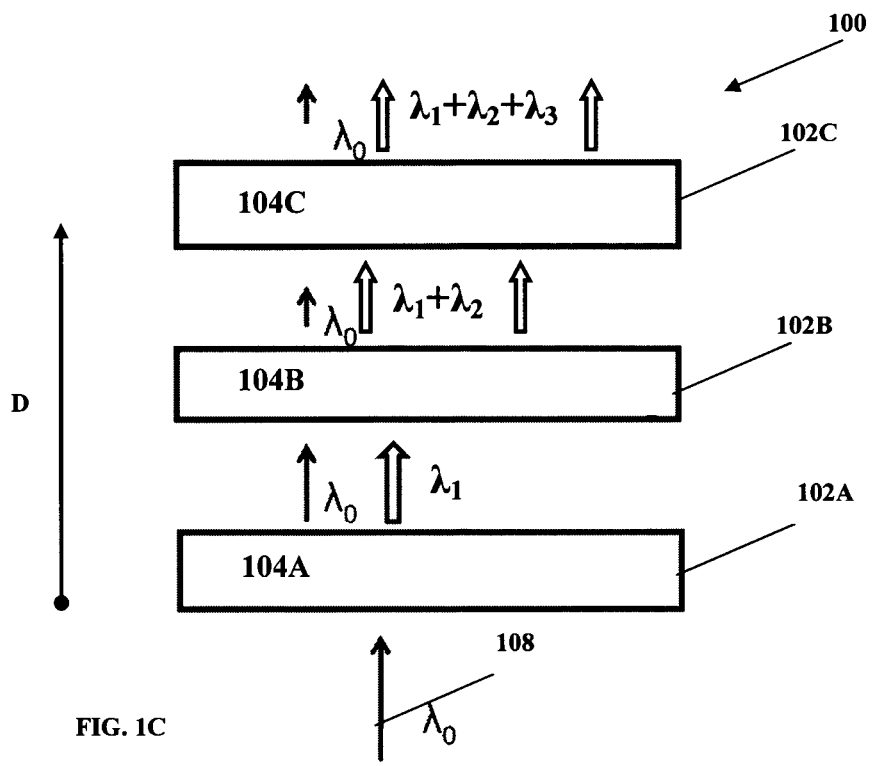

Reference is made to FIGS. 1A to 1C showing examples of an optically active structure 100 of the present invention for use in a lighting device, e.g. a back light source for a display. The optically active structure 100 of the present invention includes optically active nanorods (i.e. optically pumped for emitting light) of two or more groups, two such groups G1 and G2 being shown in FIGS. 1A and 1B, and three groups G1, G2 and G3 being shown in FIG. 1C. The groups of nanorods differ from one another in a wavelength of emitted light and/or polarization of emitted light. The nanorods of two or more groups are arranged so as to define one or two axes of orientation/alignment, such that the nanorods of the same group are homogeneously oriented with an axis of alignment either substantially parallel or substantially perpendicular to that of at least one other group.

In this connection, it should be noted that the nanorods of groups G1 and G2 are exemplified in FIG. 1B as being aligned along mutually perpendicular axes of orientation/alignment A1 and A2 and emitting light of different wavelengths λ1 and λ2. However, the invention is not limited to a combination of these features, and different orientation is shown in combination to different emission wavelength just to facilitate illustration of different groups of nanorods.

FIG. 1A illustrates an optically active structure 100 according to an embodiment of the invention. The structure 100 defines a single layer 102 (film), and contains emitting anisotropic nanoparticles (nanorods) 104A and 104B of different groups G1 and G2 respectively. The nanorods 104A and 104B of the different groups G1 and G2 emit light of different wavelengths when exposed to pumping illumination. In this example, nanorods of the two (or more) groups are mixed between them within the same region of the film. Also, in this example, the different nanorods are all aligned along substantially parallel axes, but are configured differently (materials and/or size) to thereby emit at least two light components L1 and L2 of different wavelengths and with substantially similar polarization in response to pumping light 108.

In either embodiment of the invention, the nanorods may for example be configured to emit wavelengths of primary colors (R, G, B) in response to UV or violet pumping, or may include nanorods emitting red and green colors in response to blue pumping. As indicated above, the nanorods may be aligned such that the axis of alignment of nanorods of one group is parallel or perpendicular to axis of alignment of nanorods of other group.

FIG. 1B illustrates the light emitting structure 100, which similar to the previous example defines a single layer 102 (film), and contains emitting anisotropic nanoparticles (nanorods) 104 and 106 of different groups G1 and G2 respectively. The nanorods of each group are homogeneously oriented, and may have the same or perpendicular orientation as compared to the nanorods of the other group. There may be more than two groups of nanorods, but still there is either one or two perpendicular axis of nanorods' orientation. Differently from the example of FIG. 1A, in the example of FIG. 1B, the nanorods of different groups have perpendicular orientations, respectively, and these groups are spatially separated, i.e. are located in specially separated regions. Also, in the example of FIG. 1B, nanorods 104 and 106 respond to pumping light 108 by emission of light components L1 and L2 with different polarizations.

It should be noted that in some embodiments the groups of nanorods aligned with perpendicular axis of alignment (emitting light of orthogonal polarizations) may also include nanorods emitting light of different wavelengths to provide polychromatic (white) light.

Thus, in a lighting device of the invention, the optically active structure 100 is exposed to pumping or exciting light 108 typically of a shorter wavelength than that emitted by the nanorods in response, e.g. UV exciting light causes emission in the visible spectrum. The pumping light may be polarized or non-polarized, and is directed from a light source 110. It should be understood that the light source 110 incorporated in the lighting device may be constituted by a light emitter (which may be any suitable light emitter), for example a single LED, a plurality of LEDs arranged in a suitable manner, a CCFL, and/or may be constituted by a light guide (e.g. waveguide, optical fiber) associated with an external light emitter. Nanoparticles 104 and 106, when excited by (polarized or non-polarized) pumping light 108, emit substantially polarized (fully or partially polarized) light 112 which, as indicated above, is of longer wavelength (s) (smaller energy) than the excitation light, and has preferred polarization defined by (generally parallel to) the alignment axis of the nanorods. In the example of FIG. 1B, light component L1 has polarization axis 114 and light component L2 has polarization axis 116.

In some embodiments, the anisotropic nanoparticles may be of compositions and sizes such that they emit at different base colors to achieve a required color gamut, see for example PCT publication WO 2010/095140 assigned to the assignee of the present application. Some parameters of the nanorods (material composition and size) suitable to be used in the present invention are exemplified further below.

Pumping light 108 is efficiently absorbed by the nanorods 104 and 106 in the layer 102, which then down-convert light 108 to emitted light components L1 and L2 of longer wavelength(s) defined by the characteristics of the nanoparticles (material composition and size). It should be understood that the optically active structure of the invention is optically excitable, without a requirement for electrical or any other stimulus. Since the nanoparticles are aligned in the structure 100, emitted light L1 and/or L2 is substantially polarized (partially or fully), e.g. has at least 51% of the emitted intensity within the well defined preferred polarization, or at least 60% of the intensity. In some configurations, the optically active structure may emit light such that about 80% or more of the emitted light intensity is of the desired polarization.

FIG. 1C illustrates yet another example of an optically active structure 100 in which nanorods are arranged in at least two spaced-apart layers—three such layers 102A, 102B and 102C being shown in the present example, which are spaced along an axis of general direction D of propagation of pumping light 108. The nanorods of different layers include different anisotropic particles 104A, 104B and 104C, emitting light of different colors (marked by different wavelengths $\lambda_1$, $\lambda_2$, $\lambda_3$) in response to optical excitation by pumping light 108 of wavelength $\lambda_0$. In this configuration, the layers (matrices embedding the nanorods or substrates carrying the nanorods) are partially transmitting with respect to the wavelength of pumping light. For example, the first (bottom) layer 102A includes red-emitting nanorods 104A ($\lambda_1$), the second (middle) layer 102B includes green emitting nanorods 104B ($\lambda_2$), and the third (top) layer 102C includes blue emitting nanorods 104C ($\lambda_3$). While this configuration is more complicated as it comprises three layers, it may allow better tailoring of the color gamut with reduced losses due to re-absorption effects. It should be noted that generally such a cascaded configuration may be formed by at least two layers/films of different nanorods. Pumping light 108 impinges onto layer 102A and is partially absorbed by the nanorods in the layer 102A thereby causing $\lambda_1$ emission therefrom. Both the pumping light (a portion thereof) and the emitted light propagate towards and interact with layer 102B, thereby causing emission of light of wavelength $\lambda_2$, and the so-produced three light components of wavelengths $\lambda_0$, $\lambda_1$ and $\lambda_2$ impinge onto layer 102C, resulting in three output colors $\lambda_1$, $\lambda_2$ and $\lambda_3$, together with pumping light which can then be either used as part of output light or may be filtered out (i.e. absorbed or deflected away from the general direction of propagation of light output from the device). To this end, in some embodiments, a lighting device of the invention may optionally further include a reflective filter layer which transmits the pumping (excitation) wavelength but reflects the emitted polarized colors. Such wavelength selective filters that transmit the impinging/pumping light and reflect the emitted light may also be placed between the layers, e.g. a wavelength selective filter that transmits wavelength $\lambda_0$ and reflects wavelength $\lambda_1$ may be place between layers 102A and 102B. Such configuration is more useful when the emitted wavelength increases between the successive layers. In some embodiments, a UV (pumping light) blocking layer may be used which absorbs residual pump energy to obtain better color purity (for violet light) or safety (for UV light).

It should be understood that an order of successively emitted light components can be different. The arrangement may be such that the successively emitted light have wavelength increasing or decreasing from layer to layer, or be of another alternating fashion. If the arrangement is such that a successive layer emits longer wavelength than the preceding layer (with respect to the general direction of propagation of the pumping light), then it may be the case that light emitted by the preceding layer when interacts with the nanorods of the successive causes light emission from the successive layer.

The polarized light emitted by the structure 100 (of any one of the above configurations) may be used as back illumination for a transmitting-mode LC panel, e.g. in a display or SLM (spatial light modulator) device (not shown). The polarized light characteristic provides energy saving by reducing losses common to backlight systems based on passive polarizers. In contrast with the unpolarized light generated by known backlight systems, which passes through a passive polarizer thus losing about half of the backlight energy, polarized light generated by the structure 100 in a lighting device of the invention has significantly smaller losses, thereby saving energy. Since light from the structure 100 is already polarized (partially or fully), it may be transferred efficiently through a passive polarizer properly aligned in its transmission axis, thereby even more increasing the degree of polarization.

As indicated above, in addition to the polarization properties, the light rays emitted by the structure 100 typically have an intensity distribution such that the intensity in directions lying within a small angle relative to the plane perpendicular to the alignment axis of the corresponding group of nanorods is higher than at larger angles with respect to said plane. Thus, a preferential plane of propagation with more intensity of the emitted light is obtained, perpendicular to the alignment axis of the nanorods. This effect decreases the amount of light which might escape from the sides of the lighting device and enables higher energetic efficiency for illumination.

Figure 1D:
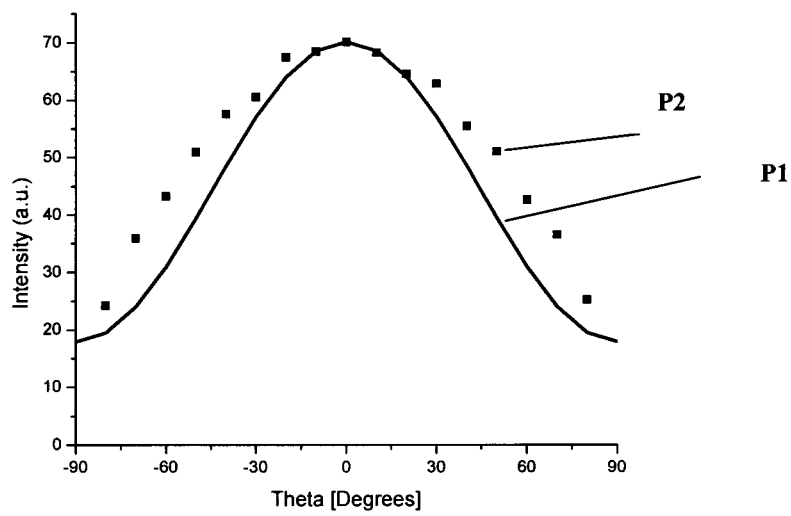
FIGS. 1D and 1E show theoretical and experimental measurements of spatial intensity distribution of light emitted by a layer comprising aligned optically active nanorods.
Figure 1E:
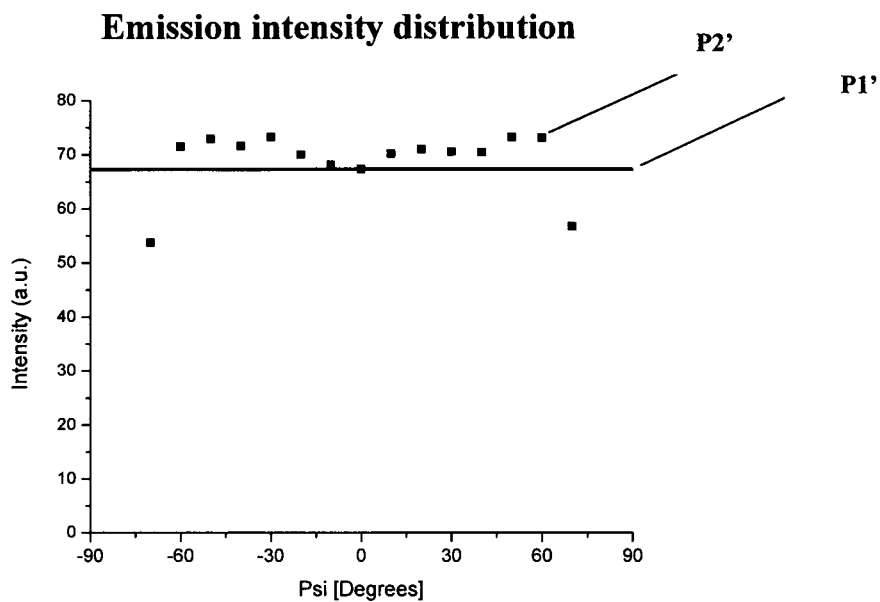

In this connection, reference is made to FIGS. 1D and 1E showing theoretical (P1 and P1') and experimental (P2 and P2') values for intensity distribution of the emitted light as function of respectively, elevational (Theta) and azimuthal (Psi) angles of light propagation with respect to the longer axis (alignment axis) of the nanorods. It is evident that light emitted from nanorods aligned in the optically active structure propagates preferentially in directions lying within a small angle relative to a plane perpendicular to the alignment axis of the nanorods. In some embodiments, due to such directionality of emission, a nanorods containing layer may advantageously eliminate a need for a brightness enhancement film (BEF) in a display device or the like. It should be noted that a use of brightness enhancement film, reflectors, or optical components in the path of the light emitted from the nanorods, i.e. between the nanorods containing layer/structure and a pixel arrangement of an LC panel, in order to provide additional directionality and focusing effects is still possible and may be beneficial. This will be exemplified further below.

Generally, any nanoparticle capable of polarized emission (i.e. anisotropic nanoparticle or nanorod) can be used in the optically active structure of the invention. Such nanorods typically have as aspect ratio (ratio between its length and cross-sectional dimension) of at least 1.8. In some embodiments, the nanoparticles may be anisotropic semiconductor nanorods. The nanorods may be single component semiconductor nanorods or core/shell nanorods with a core of a first semiconductor and a shell layer of a second semiconductor. The latter structure enhances the emission of the nanorod. Core/multishell nanorods may also be used, and similarly nanoparticles of the core/shell configuration where the shell is of graded composition may be used. Alternatively, the nanorods may be seeded rods, where a nearly spherical core seed, or a rod shaped seed, of one semiconductor is overcoated by a rod shaped shell of a second semiconductor which imparts the anisotropic properties of the emission. All such anisotropic rods emit light polarized along an axis parallel to the long axis of the structure (varying degrees of polarization are possible). The seed itself may also have an elongated shape or even a rod structure (e.g. with the 1.8 aspect ratio or higher), further enhancing the polarization degree of the final structure. Some examples of seeded rods suitable to be used in the optically active structure of the present invention are described in PCT/IL2011/000734 assigned to the assignee of the present invention.

Anisotropic nanoparticles useful in various embodiments of the invention may be in general made of semiconductor materials, for example II-VI, III-V, or IV-VI semiconductors and combinations thereof. Such materials are also described in more detail in the above-indicated WO 2010/095140 assigned to the assignee of the present application. A semiconductor material may be selected from CdS, CdSe, CdTe, ZnS, ZnSe, ZnTe, ZnO, GaAs, GaP, GaAs, GaSb, HgS, HgSe, HgTe, InAs, InP, InSb, AlAs, AlP, AlSb, $Cu_2S$, $Cu_2Se$, $CuInS_2$, $CuInSe_2$, $Cu_2(ZnSn)S_4$, $Cu_2(InGa)S_4$, $TiO_2$ alloys thereof, and mixtures thereof. This list of materials may refer to either the rod material (in the case of nanorods), to the core and shell materials (in core/shell nanorods), or to the seed and rod materials in seeded rod structures. Seeded nanorods may have a seed (or core) located asymmetrically within an elongated shell. The core may be typically located at about one fourth to one half of the length on the elongated particle, but other locations may also be possible. Typical sizes for a seed may be between 1 to 20 nm and more particularly between 2 to 10 nm diameter. In addition to a first shell, further shell layers may be included for stability and optical function. The combination may be tuned to provide emitting colors as required for the application.

In some embodiments, surface ligands may overcoat the entire nanoparticle structure. Additional ligands may also be used to improve the formulation. Ligands in common use include phosphines and phosphine oxides such as Trioctylphosphine oxide (TOPO), Trioctylphosphine (TOP) and Tributylphosphine (TBP); phosphonic acids such as Dodecylphosphonic acid (DDPA), Tridecylphosphonic acid (TDPA), Octadecylphosphonic acid (ODPA) and Hexylphosphonic acid (HPA); amines such as Dodecyl amine (DDA), Tetradecyl amine (TDA), Hexadecyl amine (HDA) and Octadecyl amine (ODA); thiols such as hexadecane thiol and hexane thiol; and mercapto carboxylic acids such as mercapto propionic acid and mercaptoundecanoicacid. Additional ligands custom made for a specific purpose can also be used. The length of the overall nanorod structures may exemplarily range between 8 nm to 500 nm and better between 10 to 160 nm. The overall diameter of a rod may exemplarily be between 1-20 nm, and more particularly between 1-10 nm. A typical nanorod has an aspect ratio length/diameter of above 1.5, or preferentially above 3. Through control of size and compositions, the emission color of the anisotropic nanorods can be tuned for different samples to provide the required base colors of a display. For example, a single type of rod sample can be used for a monochromatic backlight source for a monochrome display, or a combination of two or more different rods emitting at different colors can be used for a color display.

As indicated above, the optically active structure 100 of the present invention may be produced as a layer on a substrate made of glass or polymer. Its thicknesses may exemplarily range from 10 nm to a few micrometers (e.g. 2 micrometers or higher). Alternatively, the structure 100 may include a matrix material embedding the nanorods and providing desired mechanical, chemical and optical properties. The matrix materials can be chosen from materials such as a polymer (formed from liquid or semisolid precursor material such as monomer), epoxy, silicone, glass or a hybrid of silicone and epoxy. Specific examples of polymers include polymers selected from fluorinated polymers, polymers of Polyacrylamide, polymers of Polyacrylic acids, polymers of Polyacrylonitrile, polymers of Polyaniline, polymers of Polybenzophenon, polymers of poly(methyl mathacrylate), silicone polymers, Aluminium polymers, polymers of Polybisphenol, polymers of Polybutadiene, polymers of Polydimethylsiloxane, polymers of Polyethylene, polymers of Polyisobutylene, polymers of Polypropylene, polymers of Polystyrene and Polyvinyl polymers. In an embodiment, the polymers may be selected from polyvinyl and fluorinated polymers. In other embodiments, the polymer may be polyvinyl-butyral, polyvinyl alcohol or polymethyl methacrylate. The thickness of such matrix with embedded nanorods may exemplarily range from 1 micrometer to 1 millimeter or higher. The thickness may preferably be between 10 micrometers to 800 micrometers and more preferably between 50 microns to 350 micrometers.

In an embodiment, relatively short wavelength light (e.g. UV or violet) from an essentially uniform source is directed on structure 100 in which the anisotropic nanoparticles may be of several populations (groups) emitting light of different wavelengths, all longer than the pumping light, for example populations emitting at blue, green and red colors. The nanoparticles can absorb part of the UV or violet light and emit light at longer wavelengths in the blue, green and red, transforming the light from the short wavelength to the longer wavelengths.

Reference is now made to FIGS. 2A to 2D illustrating other embodiments of a lighting device (or backlight system) 300 of the invention utilizing an optically active structure (APEL) 100 containing aligned nanorods and exposed to pumping light 108. In these examples, a so-called side pumping is used where the APEL is illuminated and pumped from at least one edge of the layer. As indicated above, pumping light may or may not be randomly polarized, coming from internal or external light emitter of any suitable type. The APEL absorbs the pumping light and converts it by emission of substantially polarized light of one or more colors determined according to parameters of the nanorods present in this layer. Polarization and color schemes of the emitted light are determined in accordance with the requirements of the specific system, e.g. according to parameters of an LC based display system. As also indicated above, the AEPL containing aligned nanorods emits light which propagates preferentially in directions lying within a small angle relative to a plane perpendicular to the alignment axis of the nanorods, and may be directed to the LC panel of the display device.

As shown in the figures, the lighting device 300 is typically configured to define a general axis of propagation d of light output from the device. To this end, various suitable techniques can be utilized to deflect emitted light towards one or more directions along axis d. Considering the side pumping, a relative orientation between an axis of general direction of propagation D of the pumping light onto the structure 100 and the general axis of propagation d of the output light are selected to be intersecting axes, preferably substantially perpendicular axes.

Figure 2A:
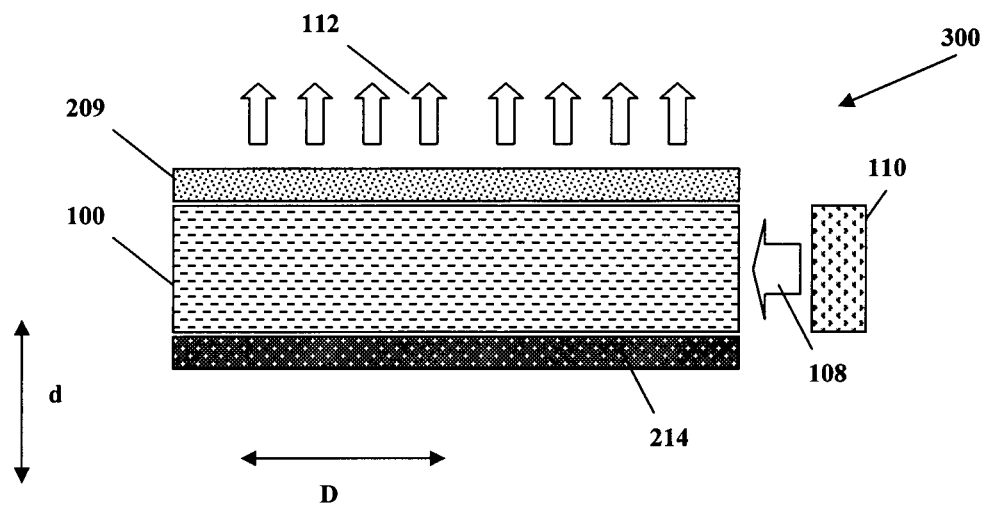
FIGS. 2A to 2D show schematically embodiments of a lighting device of the invention configured for use for example in a back light system and utilizing an optically active structure exposed to side pumping illumination.
Figure 2B:
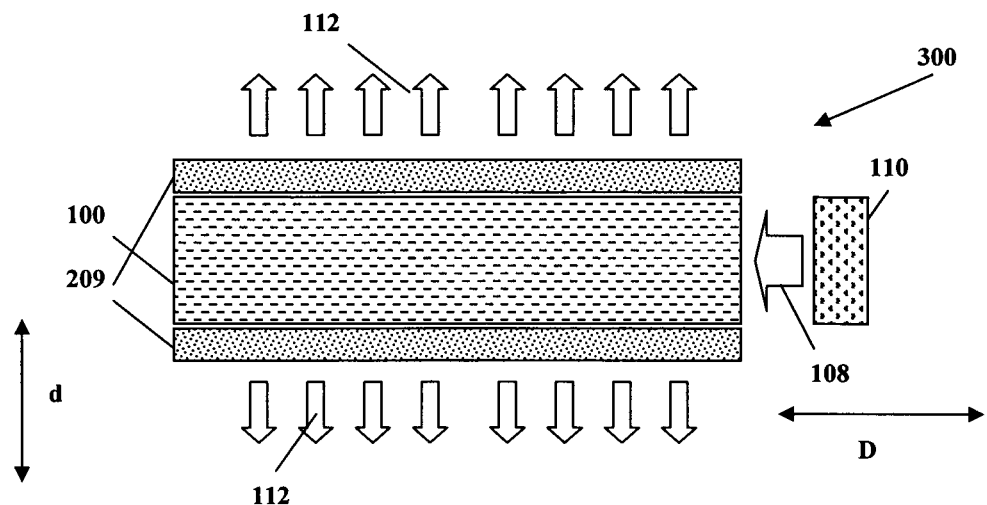

In the example of FIG. 2A, a reflective surface 214 is used at one side of the structure for reflecting light emitted at said side towards the general direction d. Also optionally provided in the device 300 is a further light directing or a so-called light extraction element 209, which in the present example is a layer at the other side of the structure 100. Such light extraction element 209 may be a wavelength selective deflector (e.g. grating, multilayer thin film coating, multilayer polymer film) or a refracting element defining one or more refracting interfaces, e.g. diffusive lens array or a tilted surface of the structure (wedge or wedge-like surface). The light extraction element 209 may be integral with the optically active structure 100, attached externally thereto, or it may be spaced apart creating a gap between the light extraction element 209 and the structure 100. Such gap may be filled with a material providing refractive index matching. Considering the structure 100 configuration in which the aligned nanorods are embedded in a matrix or carrier, the latter may be configured as a waveguide with respect to pumping light wavelength. It should be noted that although the waveguide shape is exemplified in the figure as having a rectangular cross section, other shapes such as wedge-like shapes, curved surface wedge shapes and other geometries may be used for the purposes set forth herein. FIG. 2B exemplifies one more configuration of the lighting device 300 of the invention, configured to provide substantially polarized light output in two opposite directions along the axis d of general output light propagation. In this example, the light extracting element 209 is provided on two opposing surfaces of the optically active structure 100. Such configuration may be used for display system configured to provide images on both sides of the display panel.

Figure 2C:
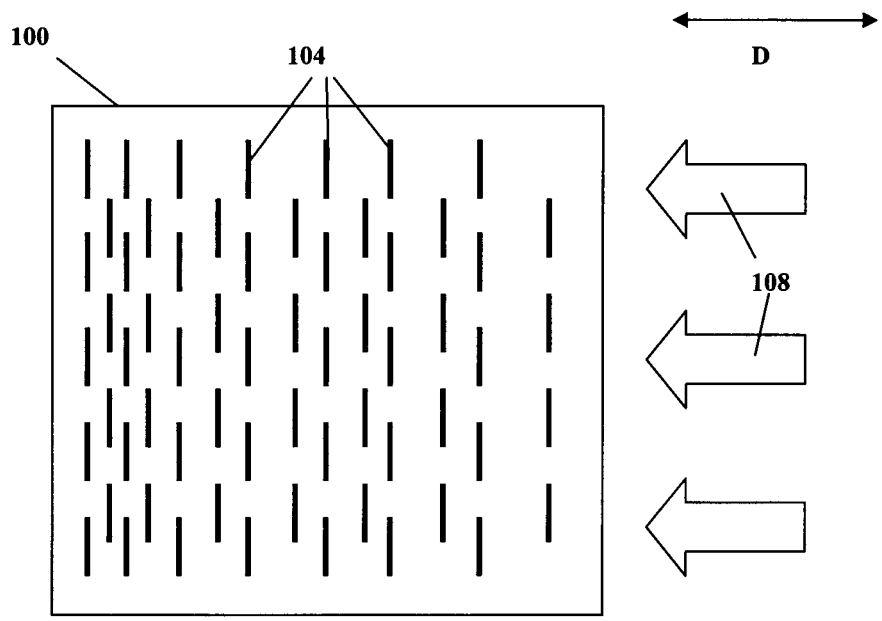
Figure 2D:
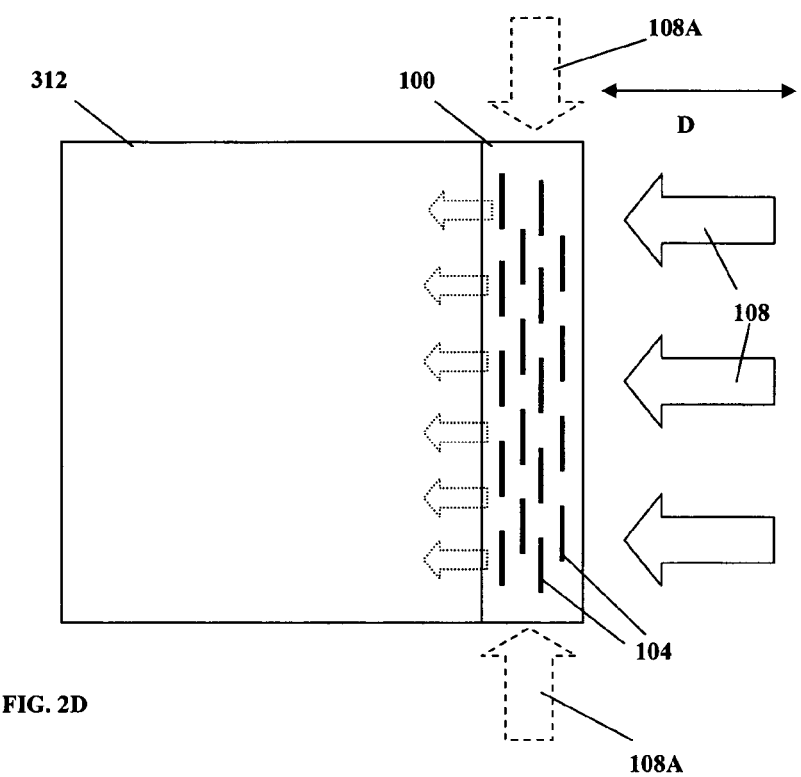

FIGS. 2C and 2D illustrate top views of an optically active structure APEL 100 of a specific but not limiting example suitable to be used in the above described polarized lighting devices of FIGS. 2A and 2B. In the example of FIG. 2C, the structure includes a layer formed by nanorods 104 (of the same or different groups) embedded and aligned in a carrier, where the nanorods are distributed with a gradually increasing density (concentration) along an axis parallel to the side pumping direction D. The carrier may be configured as a waveguide. The concentration gradient and varying concentrations are tailored for optimal emission from the structure. In this example of FIG. 2C, the concentrations of the nanorods is non-uniform and there is a gradient with more rods far from a pumping light source and fewer rods closer to it. The polarized light emitted from the structure 100 is directed along general axis of propagation d of the output light (e.g. upwards toward the display section) being perpendicular to the direction D of the exciting light. In FIG. 2C and FIG. 2D the nanorods are aligned perpendicular to the direction D. It should however be noted that other orientations of alignment axes are possible, and in time preferable. For example the nanorods may be aligned along an axis oriented with 45 or 135 degrees with respect to direction D, in the plane of the figure. Such alignment angle is sometimes used by screen manufacturers in polarization design. This configuration can compensate for the absorption of pumping light along the structure such that substantially homogenous illumination can be achieved across the entire device. The spatial distribution of the nanorods can also have a certain 2D pattern to accommodate for 2D effects caused by the light distribution in the structure.

In the example of FIG. 2D, the structure 100 is associated with a separate light director 312 which is located adjacent to/interfacing with a side of the structure 100 (containing the aligned nanorods). Pumping illumination may impinge on the structure 100 along various directions. In particular the pumping illumination (pumping light 108) may be directed on the structure 100 along a certain general direction D to impinge onto the structure 100 on its side opposite to that interfacing the light director 312. Alternatively or additionally, the pumping light may be directed on the structure 100 from other directions, one such direction is shown in FIG. 2D: pumping light 108A is incident on the structure from a direction perpendicular to the direction D. In this example, the aligned nanorods may be embedded in a carrier or deposited on a substrate, and have substantially uniform concentration distribution along the carrier/substrate. As shown in the figure, the light directing element 312 is preferably configured as a waveguide for emitted light wavelength(s) and as is further illustrated in the figure, the waveguide may be configured with a wedge or wedge-like surface configured to break total reflection of light and operate as a light extraction layer. The waveguide 312 may also include a reflective layer (preferably a polarization preserving reflector) on its other surface (bottom surface in FIG. 2D). Such a configuration might be more economical as it requires fewer anisotropic nanoparticles in the structure. The effects of light down-conversion into polarized emitted light occur in a limited space defined by the structure 100 before the emitted polarized light is directed by external element 312 towards a required direction.

It should be noted that pumping light 108 exciting the nanorods to emit polarized optical radiation may be directed onto the structure 100 from various directions. For example, the general direction D of propagation of pumping light may be substantially parallel to the desired general direction d of propagation of output light (i.e. propagation light emitted by the optically active structure 100 and then interacted with the light directing element 312). Alternatively or additionally, the pumping light may impinge on the optically active structure 100 from various other directions, one such direction being exemplified in FIG. 2D as pumping light 108A propagating substantially parallel to the alignment axis of the nanorods in the structure 100.

As indicated above, the lighting device of the invention may utilize light extraction elements (e.g. element(s) 209 in FIG. 2B). The use of wedge-like light-guide element or generally a refractive structure/interface in an optical path of light emitted by nanorods also advantageously utilizes the directionality of nanorods' emission thereby further improving brightness of the device. It should be noted that directionality of nanorods' emission results in that only a small portion of light intensity propagates to the two facets of the waveguide that are perpendicular to the nanorods alignment axis and thus simplifying the directing of the emitted light to the desired directions of propagation.

Figure 3A:
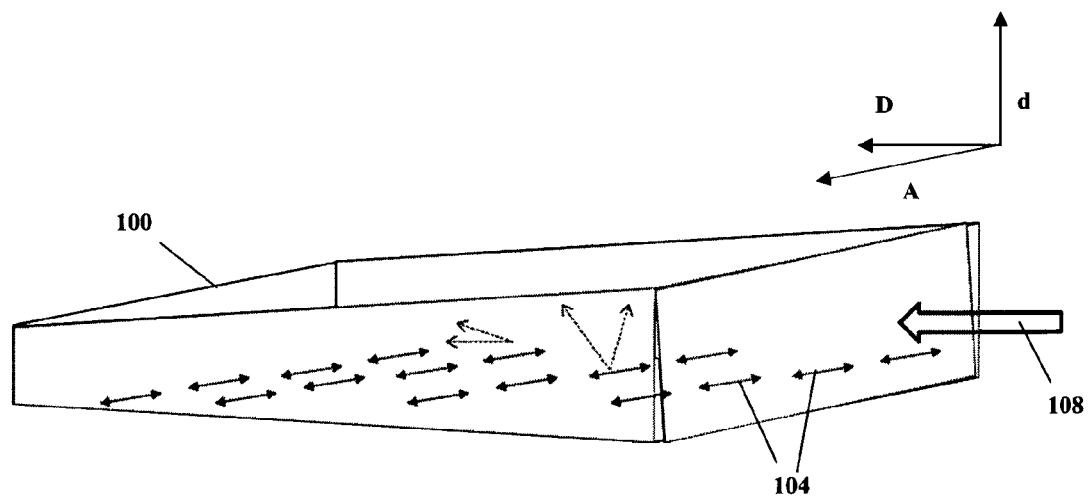
FIGS. 3A to 3C exemplify schematically a use of a wedge-like light guide as the optically active structure (FIG. 3A) or for directing emitted light (FIGS. 3B and 3C)
Figure 3B:
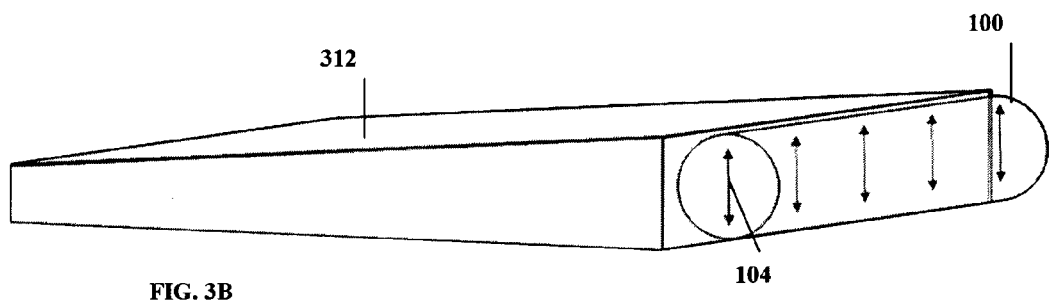
Figure 3C:
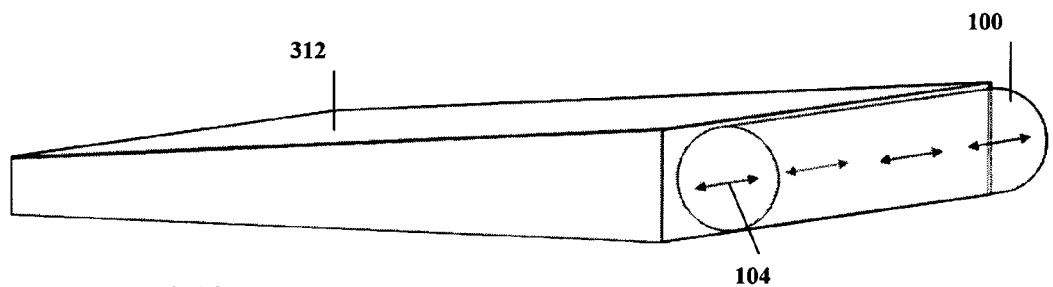

It should be understood that aligned nanorods might be embedded in a wedge-like carrier and/or embedded in a carrier/substrate which interfaces an external light director configured as a waveguide with or without wedge-like surface. This is exemplified in FIGS. 3A to 3C showing an optically active structure which may be configured to provide polarized illumination and may be used for back light illumination system. The examples of FIGS. 3A to 3C illustrate a use of wedge-like light director, being either a carrier for the nanorods (e.g. nanorods are embedded in such carrier) or a separate light directing unit. In addition, the directionality of the radiation emitted from nanorods results in that the majority of the emitted light propagates within the acceptance angle of the wedge-like waveguide.

FIG. 3A shows an optically active structure 100 formed by a plurality of nanorods of the same or different groups (e.g. emitting the same or different wavelengths) having a common alignment axis A which are embedded in a wedge-like carrier/matrix. The structure 100 is exposed to side pumping 108, i.e. pumping direction D is substantially perpendicular to the structure's output light propagation d and in this example is also perpendicular to the alignment axis. It should be understood that generally, with the side pumping, the pumping direction is either parallel or intersecting (e.g. perpendicular) to the nanorods' alignment axis, but is intersecting (preferably perpendicular) to the output light propagation axis.

FIGS. 3B and 3C exemplify two configurations of the optically active structure 100 where nanorods or nanorods' carrier/substrate interfaces a wedge-like light director element 312. More specifically, the structure 100 is a strip-shaped film or cylindrical encapsulation containing the nanorods of the same or different group having the same alignment axis, and this structure interfaces with a wider side of the wedge 312. The nanorods are aligned substantially perpendicular (FIG. 3B) and parallel (FIG. 3C) to the bottom surface of the wedged element, while in both cases extending along said interface (the respective side of the wedge). The configuration of FIG. 3C might be advantageous for the polarization purposes because a large portion of emitted radiation enters the waveguide in the forward direction, with its polarization vector oriented roughly parallel to the face of the slab. Hence, in subsequent internal reflections from the sides of the slab the polarization of the light will not be affected significantly. It should be noted that angles of nanorod alignment other than those shown in FIG. 3B and FIG. 3C can be useful as they can provide both better polarization output and better coupling.

It should be noted that the use of nanorods to couple light into a wedged (or slab) waveguide offers various advantages over isotropic nanoparticles such as QD's. More specifically, in some embodiments where the nanorods are aligned substantially parallel to the long axis of the cylindrical encapsulation as seen in FIG. 3C, a large proportion of the radiation enters the waveguide in the forward direction, with its polarization vector oriented roughly parallel to the face of the slab. Hence in subsequent internal reflections from the sides of the slab the polarization of the light is essentially preserved providing polarized light output and offering significant energy savings. As exemplified above, in some other embodiments, a strip-shaped film or cylindrical encapsulation containing nanorods oriented perpendicular to the plane of the wedge (or slab) can be used being placed at the wide end of the waveguide between the waveguide and the pumping source. The directionality of the resulting radiation means that more of the light falls within the acceptance angle of the waveguide.

Reference is made to FIGS. 4A to 4E exemplifying how the present invention can be used as color polarized light source, as well as a light source for 3D display/projector.

Figure 4A:
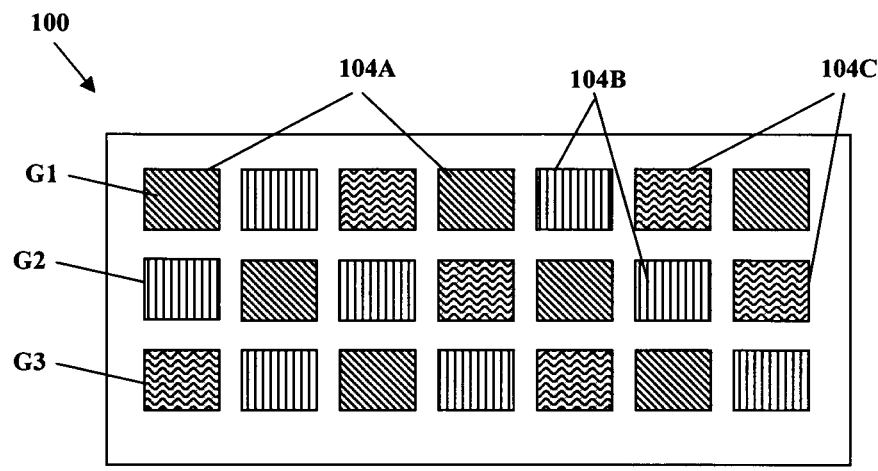
FIGS. 4A to 4E show several examples of pixel arrangement of optically active nanorods for use in polychromatic and/or 3D display/projector systems.

FIG. 4A shows an optically active structure 100 in the form of a layer having a plurality of groups (in this example 3 groups G1, G2, G3) of different anisotropic nanoparticles 104A, 104B and 104C located in spaced-apart regions. Each region includes anisotropic nanoparticles that emit in a particular color, for example region of nanorods 104A includes red emitting nanorods, nanorods 104B include green emitting nanorods, and nanorods 104C include blue emitting rods. All nanorods in all groups/regions are aligned along the same alignment axis, therefore emitting light with the same polarization. This arrangement may provide a backlight for a color display. It is of course possible to have more than 3 groups/regions (colors from different anisotropic nanoparticles) to increase the color gamut.

Figure 4B:
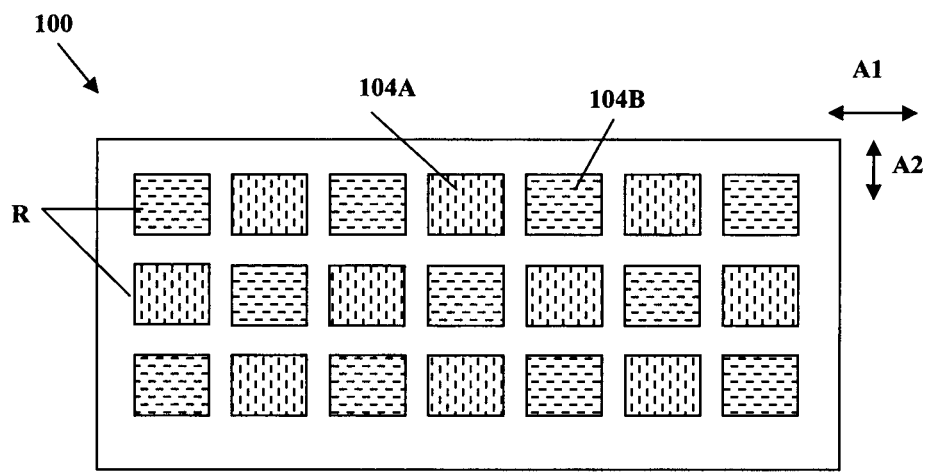
Figure 4C:
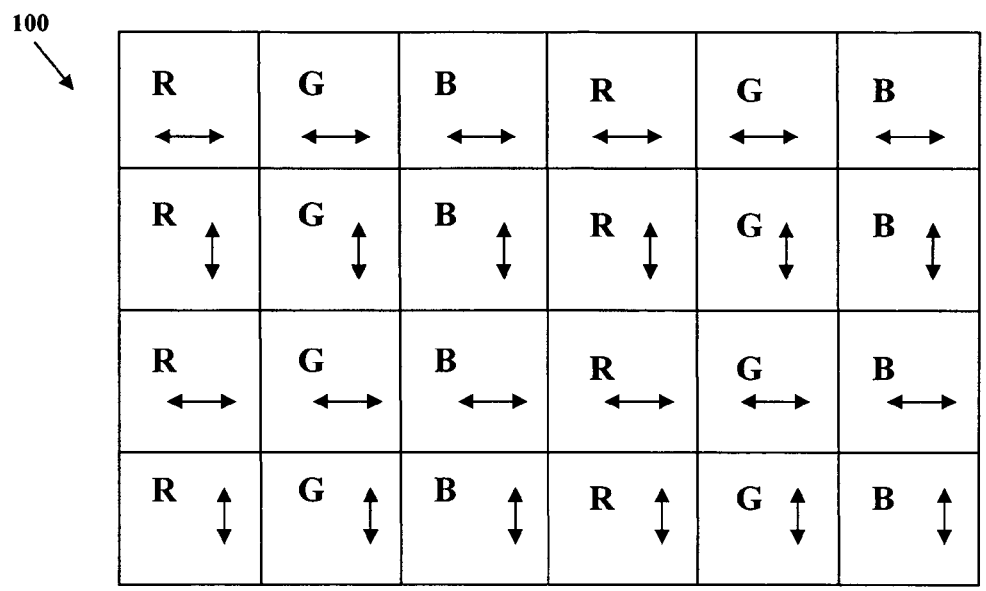
Figure 4D:
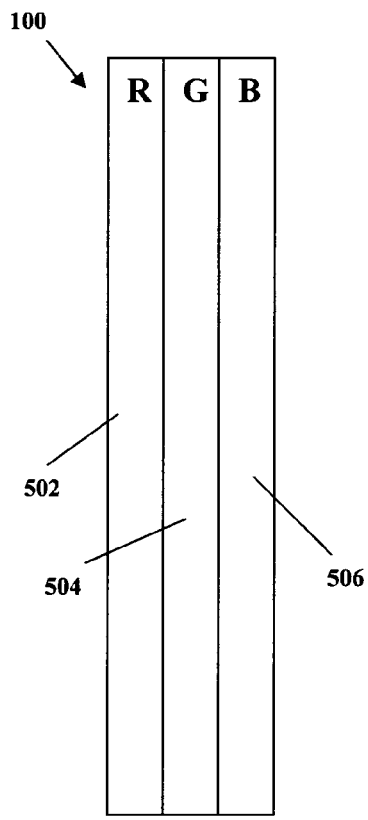
Figure 4E:
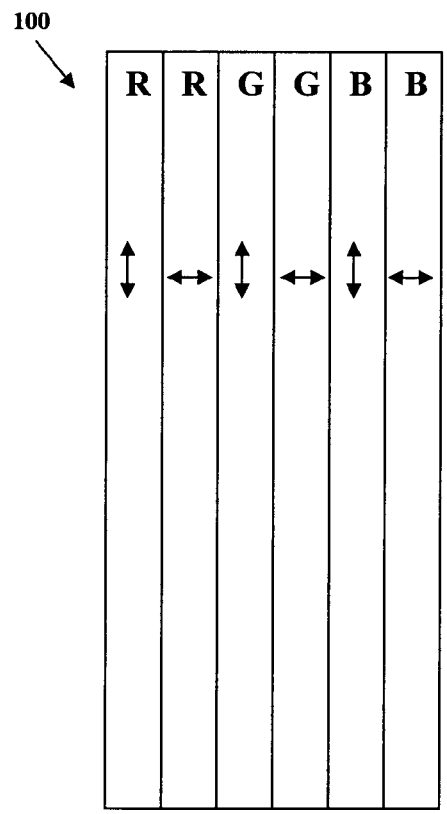

FIG. 4B shows an optically active structure 100 configured generally similar to the above described example of FIG. 4A, namely nanorods are of different groups and are arranged in a two-dimensional array of regions, generally at R. However, in the example of FIG. 4B, the nanorods of locally adjacent regions along at least one axis (in this example, along both axes) have substantially perpendicular alignment axes A1 and A2. As for the color feature, it may be used in this configuration as well: for example locally adjacent regions may include nanorods of different emitting wavelengths, or each region may include a mixture of differently emitting nanorods. In yet another example, the structure may include a cascade of two or more such layers each having groups of differently aligned nanorods but of the same emitting wavelength, while different layers include differently emitting nanorods. FIG. 4C exemplifies an optically active structure 100 configured generally similar to the above described examples of FIGS. 4A and 4B. In the example of FIG. 4C, however, the groups of nanorods located in adjacent regions along one axis of the array differ by wavelengths of light emitted thereby, while groups of nanorods located in adjacent regions along the other axis of the array are aligned with substantially perpendicular axes of alignment. Such configuration may be used for colored 3D display/projector systems Various display systems, such as billboard displays may utilize colored illumination in the form of stripes of different colors. This is exemplified in FIGS. 4D and 4E schematically showing two configurations of an optically active structure 100 in which the nanoparticles are placed in spaced-apart elongated regions (in the form of stripes) 502, 504 and 506. Similarly to the previous examples, the stripes arrangement is consistent with that of color display devices having generally three (in some cases four or more) base colors, providing an arrangement of pixels of the different colors. Each stripe includes a different population (group) of nanorods which emit at different base colors. In FIG. 4D, the nanorods of each stripe are aligned parallel to the nanorods of its adjacent stripe, as described above, providing anisotropic polarized emission with all the characteristics indicated so far in different colors of emitted light. In FIG. 4E, some adjacent stripes are different just by the alignment axis of the nanorods (being perpendicular to one another), while some other adjacent stripes are different by alignment and emitted color of the nanorods. Similarly to the configuration of FIGS. 4B and 4C, the configuration of FIG. 4E is suitable for use in 3D display systems. These configurations, typically suitable for large display systems, may eliminate, or at least substantially reduce, a need for a color filter layer in a display system. Thus, generally, in these examples, the different groups differing in polarization and/or color are arranged in an alternating fashion.

It should be noted, although not specifically shown, that when using an optically active structure 100 of the present invention in three-dimensional displays, the linear polarization of the pixel, constituted by a group of nanorods of polarization perpendicular to that of at least one of its neighbors, can be transformed into clockwise and anti clockwise circular polarized light using a suitable polarization rotator (e.g. quarter wavelength plate). This is done for example to be compatible with 3D viewing apparatus such as circular polarization 3D glasses.

Figure 5A:
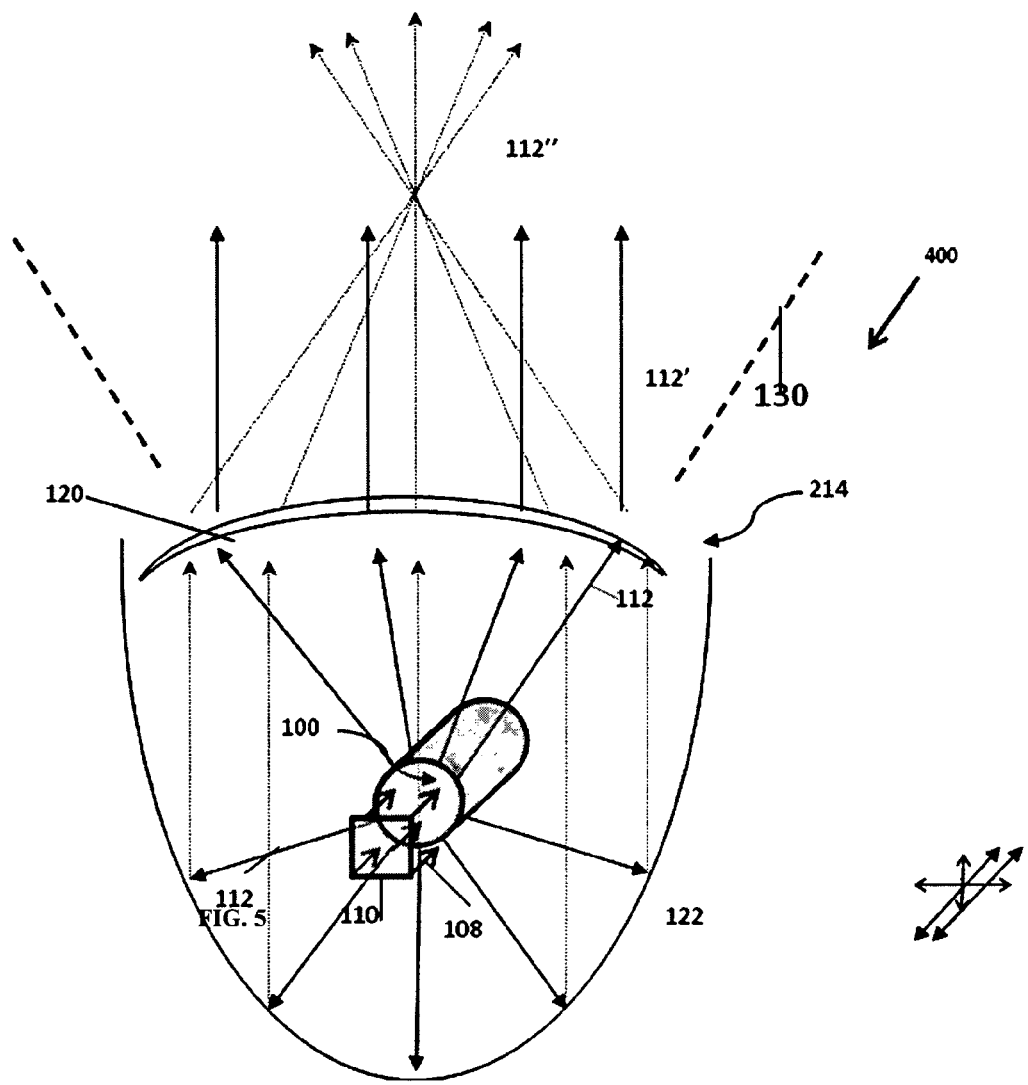
FIGS. 5A to 5C illustrate embodiments of the invention utilizing various technical solutions for providing directional and polarized (or partially polarized) light output from a lighting device; where
Figure 5B:
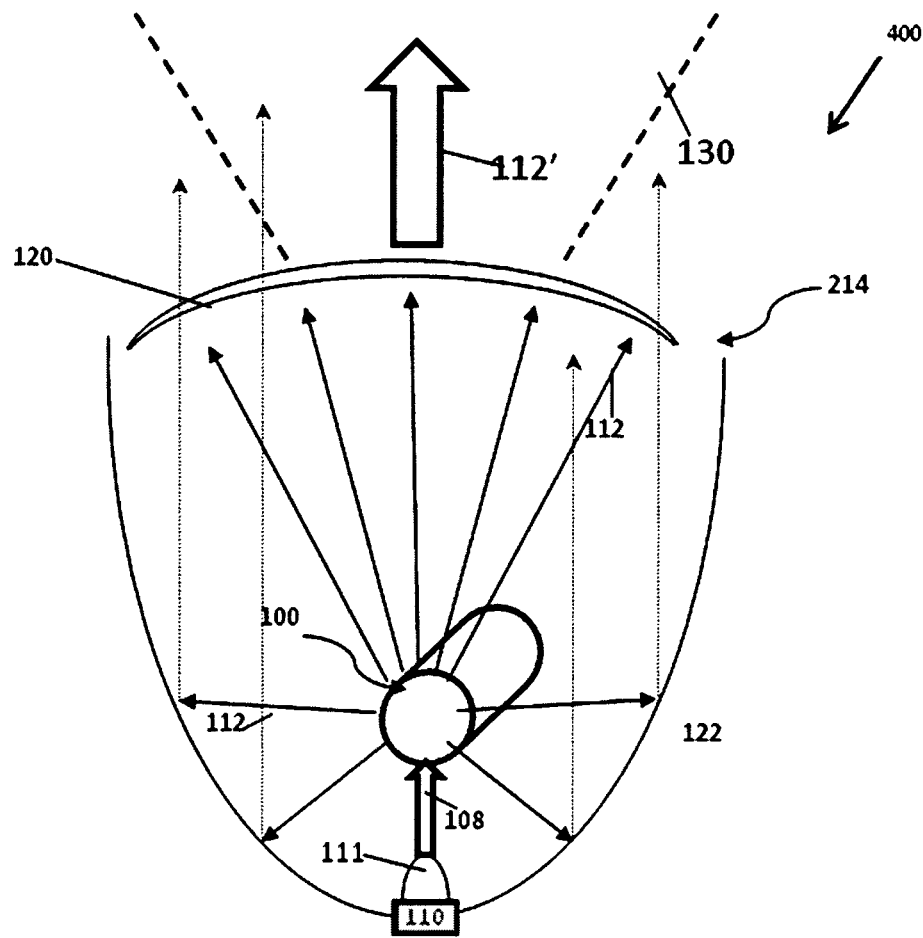
Figure 5C:
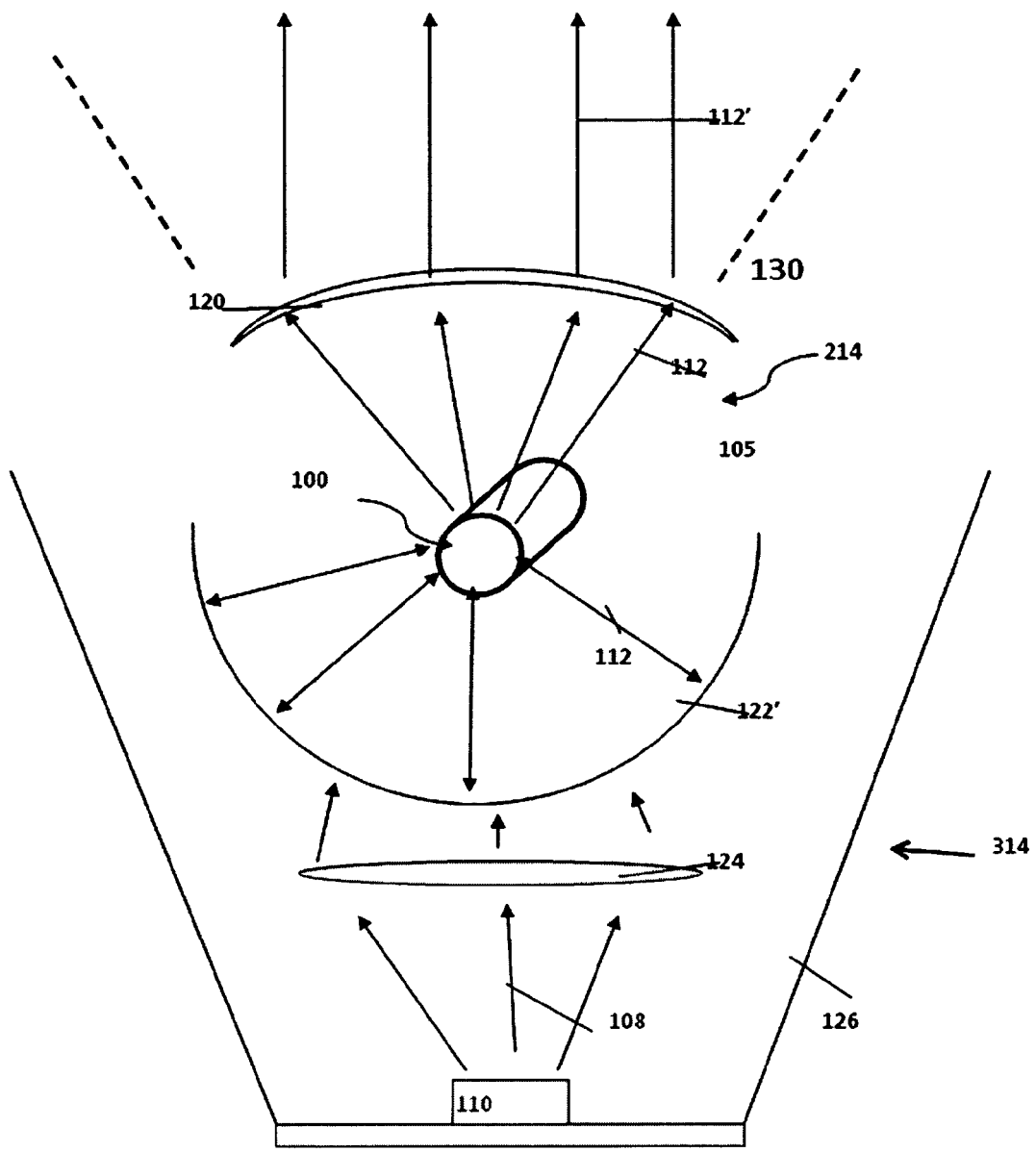

Reference is now made to FIGS. 5A to 5C which exemplify additional embodiments of the invention utilizing various technical solutions for providing directional and polarized output light from a lighting device 400. The devices shown in FIGS. 5A, 5B and 5C can also serve as pixel elements for large area displays to provide polarized and directional light. The lighting device 400 employs an APEL structure 100 configured according to the present invention, i.e. including homogeneously aligned nanorods along one axis (alignment along two axes is also possible). FIGS. 5A,5B and 5C depict the device in which the optically active structure has a cylindrical like configuration and where the longer axis of the nanorods, or alignment axis of the structure 100, extends perpendicular to the plane of the figure. By using the aligned nanorods and utilizing reflective and/or refractive optical elements/interfaces configured to substantially maintain the polarization of light emitted by the structure 100 (while being reflected therefrom or passing therethrough), the output light 112' may be substantially polarized along the original axis of the nanorods' alignment.

The APEL structure 100 may include one or more groups of nanorods differing between them by wavelength of emitted light. The groups of nanorods are aligned homogeneously such that nanorods of one group are aligned parallel or perpendicular to nanorods of another group.

Thus, the lighting device 400 includes an APEL structure 100 containing homogeneously aligned nanorods embedded in a carrier or deposited on a substrate, and a light directing/deflecting unit 214 associated with emitted light. The lighting device 400 is excited by pumping light 108 which may be directed onto the APEL structure from the side as shown in FIG. 5A (perpendicular to the plane of the figure), or from any direction within the plane of the figure as shown in FIG. 5B and FIG. 5C. The pumping light 108 is directed onto the APEL 100 from a light source 110 (e.g. LED, or any other light source or light guide as indicated above) which may include an attached optical element (e.g. lens, diffractive lens) 111 (shown FIG. 5B), used for collimation, focusing, or other manipulation/optical processing of the pumping light 108. In still other embodiments, e.g. FIG. 5C, the lighting device 400 includes alight directing/deflecting unit 314 associated with pumping light coming from the light source 110 and configured to direct pumping light onto the APEL 100. Due to the directionality and dipole-like emission of the nanorods, most of the light emitted from the structure 100 propagates in various directions lying within a small angle relative to the plane of the figure (i.e. perpendicular to the axis of alignment of the nanorods), and accordingly the lighting device may have a substantially cylinder (cylinder-like) configuration, and may be symmetric along the alignment axis. Thus, for example, cylindrically symmetric refractive, reflective and diffractive elements may be employed, however, other optical elements having different geometries, e.g. spherical mirror or lenses, may be used as well.

Some embodiments of the present invention may utilize regions containing groups of nanorods aligned perpendicular to each other (such as for 3D display systems). In these embodiments, the lighting device may be based on an array of lighting units each configured as shown in FIG. 5A-5C and arranged such that adjacent units extend along perpendicular planes. Likewise, it is possible to use multiple, space-separated light sources arranged along the long axis of the rod with either spherical or cylindrical optional lens attachments. Furthermore, the light source element(s) 110 and the optional attached lens(es) 111 may be of differing symmetry.

The light directing unit 214 includes a light deflector 122 (e.g. a cylindrical-circular or cylindrical-parabolic mirror) and optical unit 120 (e.g. one or more lenses, typically, a cylindrical lens system). The nanorods of the optically active structure 100 are excited by pumping light 108 emitted by the light source 110. The optical pumping excites the nanorods to emit light 112 which propagates preferentially along axes (in directions) lying within a small angle relative to a plane perpendicular to the alignment axis of the nanorods. Some light components of the emitted light 112 are reflected from the light reflector 122 towards the optical unit 120, while some light components propagate directly to the optical unit 120. The light directing unit 214 is utilized to provide an appropriately defined general direction of propagation of emitted light out of the device while substantially maintaining the polarization state of the output light. The light directing unit 214 also provides for reducing leakage of light and thus provides for saving energy. Light emitted from the APEL structure 100 is thus directed in an appropriate predetermined general direction of propagation suitable for the use of the lighting device 400.

FIG. 5A and FIG. 5B illustrate a use of a light deflector 122 having a parabolic cross section which, when acting in combination with the lens unit 120 provides a combination of collimation and focusing effects, i.e. collimated light 112' and focusing light 112" output. By contrast, in the example of FIG. 5C the deflecting unit 122 is a reflecting mirror of a circular cross section thereby providing collimated output light 112' from the device. The optically active structure 100 is preferably located at the front focal plane of the lens unit 120, and is preferably located such that a center thereof coincides with a center of curvature of the light deflector 122. This configuration provides substantially parallel light output (collimated light) 112', without a focusing component.

It should be noted that the above examples for use of light deflector 122 and lens unit 120 should be interpreted broadly and various other configurations (e.g. polygonal light deflector etc.) may be used. It should also be noted that relative location of the optical elements and the APEL structure 100 may differ in accordance with a desired illumination pattern and angular distribution of light output from the device.

FIG. 5C exemplifies a use of a light deflector 126 (e.g. reflector), and an optical unit 124 (e.g. one or more lenses) associated with the pumping light 108 and included in the light directing unit 314. FIG. 5C also exemplifies the use of a cylindrical light deflector 122 configured to provide collimated output light 122'. The nanorods of the optically active structure 100 are excited by pumping light 108 which is directed onto the structure 100 by the light directing unit 314. Pumping light emitted from the non-directional light source 110 such as LED propagates in various directions, and is reflected by light deflector 126 towards the structure, while may also be focused onto the structure 100 by the lens unit 124. The light deflector 122 may be wavelength selective, i.e. may be configured to transmit light of the wavelength range of the pumping light 108 while reflect light of the wavelength range of the emitted light 112 (e.g. a dichroic optical element), and may for example be configured as a cylindrical light deflector having a substantially circular cross section (or of any other geometry) configured to provide a desired pattern/distribution of light output from the device. The light deflector 122 may have a pattern (e.g. spaced-apart regions) of wavelength selective transmission (e.g. region(s) of dichroic mirror), thereby providing a wavelength selective region (aperture) for pumping light propagation to the APEL while leaving the other portion of the inner surface of the deflector (by which it faces the APEL) as a reflector for the emitted light. According to some embodiments, the light deflector 122 may have a dichroic (wavelength selective) flat region surrounded by regions of a cylindrical light deflector having inner reflecting surface.

The light emerging from lighting device 400 shown in FIGS. 5A to 5C may be further coupled into a light directing element (such as element 312 in FIG. 2A or FIG. 3A). The lighting device 400, or the light directing unit 214, may be configured so that the output light falls within an acceptance angle 130 selected according to predetermined desired illumination pattern/light distribution. More specifically, if the front focal plane of the lens unit 120 is configured to coincide with the focal region (that can be a point or line in space) of the light deflecting unit 122 (preferably parabolic), and the APEL structure 100 is located thereon, the emitted light will be a combination of collimated and focused light (as shown in FIG. 5B). Alternatively, if the front focal plane of the lens unit 120 is configured to be a short distance above (downstream with respect to general direction of light propagation) the focal region of the light deflecting unit 122, and the APEL structure 100 is situated between the location of the focal planes, the lens unit 120 provides focusing light of varying degrees. Conversely, if the front focal plane of the lens unit 120 lies below (upstream with respect to general direction of light propagation) the focal region of the parabolic-like deflecting unit 122, some or all of the emitted light 112' will be diverging, depending on the precise location of the optically active structure 100. Most generally, the exact configuration of the lighting device, i.e. location of the structure 100 with respect to light directing/extracting elements, as well as the type of such light directing/extracting optical elements (e.g. having various focal distances), is selected in accordance with desired angular distribution of output light 112' to be obtained. An optimal divergence/convergence angle of output light may be achieved while maintaining a balance between illumination pattern, energy efficiency, and overall dimensions of the lighting device/unit.

Figure 6:
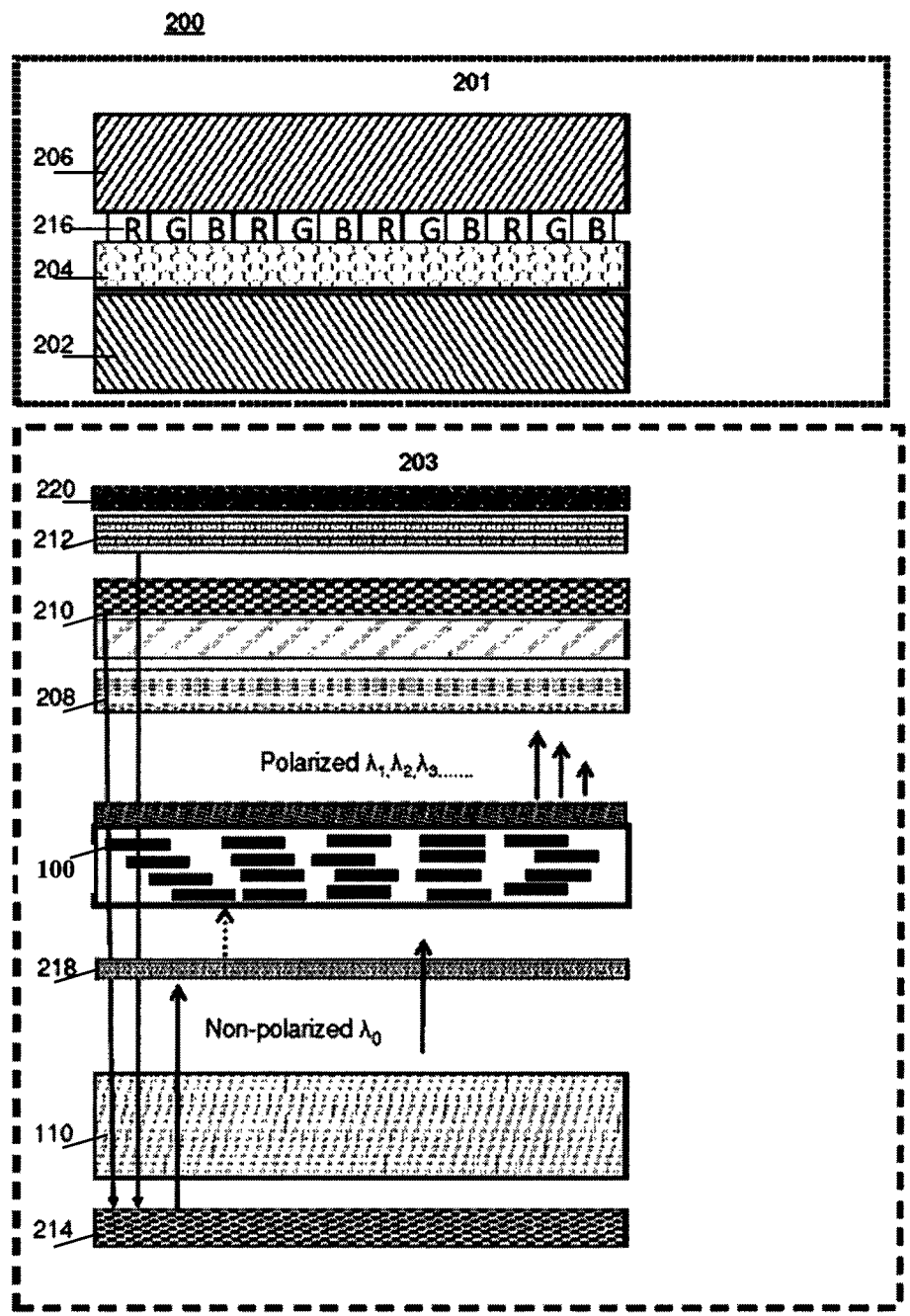
FIG. 6 shows schematically a LC-panel based display system including a backlight unit based on the optically active structure of the present invention.

Reference is now made to FIG. 6 schematically showing a specific but not limiting example of a display system 200 utilizing a backlight unit (constituting a lighting device) which includes a pumping light source 110 and an optically active structure APEL 100 of the present invention. The system 200 may be divided generally into a display section 201 (pixel arrangement) and a backlight section 203. The optically active structure 100 is preferably configured for polychromatic emission, and may have any of the above exemplified configurations (e.g. planar or cascade one). The pixel arrangement 201 is configured as an LC panel 204, and accordingly the system 200 includes a first polarizer 206 at the output of the LC panel. Also, the system 200 includes an optional color filter 216, and a second polarizer 202 at the output of the lighting device 203.

In use, short wavelength non-polarized emission (with wavelength $\lambda_0$) from the pumping light source 110 illuminates the optically active structure 100, which emits polarized light with a required color gamut (e.g. wavelengths $\lambda_1, \lambda_2, \lambda_3$) for the display device. The polarized light emitted from the structure 100 passes through an optional polarizer 202, then through liquid crystal structure 204 and through polarizer 206. The LC material may be placed between two glass plates that may also have the RGB filters and polarizers attached to them (not shown). The polarizer 202 may be used to obtain a clean, more perfect polarization state. LC structure 204 may be used as a spatial light modulator to modulate the pixels' output. A pixel cell of the LC structure 204 may block light passage therethrough, or alternatively may alter an angle of light polarization thereby causing the so-modified light to be absorbed in the polarizer 206 and modulation of the intensity of transmitted light. Further optionally provided in the system 200 are one or more optical elements such as a diffuser 208 which spatially homogenizes light distribution and if directly optically attached to the structure 100 may also assists in light extraction therefrom, a brightness enhancement film (BEF) 210, or a dual brightness enhancement film (DBEF) 212. Elements 210 and 212 may be used to improve brightness by recycling the light. In the present not limiting example the system 200 also includes a reflector 214 (the provision of which is optional) positioned oppositely from the structure 100 on the other side of the pumping light source 110. The reflector can re-circulate some of the pumping light coming from the light source and other elements. Although shown as separate components, it is to be understood that the various layers/structures may be joined or combined in different configurations while maintaining their essential functions. Color filter layer 216 is optional and used to define the color pixels of a color display.

The following are some specific but not limiting examples for preparation of specific optically active structures.

Example 1

An optically active structure comprising aligned nanorods within a polymer matrix was prepared. The rods were aligned within a polymer film by mechanical stretching of the polymer film. As a first step, the nanorods were mixed with a monomer solution of polyvinylbutyral (PVB, 200 mg) and toluene (2.4 ml). The nanorods concentration in the film was controlled by the amount added to the film, typically in the range of 0.5-3% by weight of the PVB weight. A non-scattering mixture could be obtained. A block was then cast from the polymer/nanorod melt into a mold and allowed to dry under vacuum for 12 hours, yielding a film of 1 inch in diameter and 0.4 mm thickness. For the stretching step, the block was placed in a mechanical stretching device. During the stretching the sample was heated to 110° by placing an Infra-red emission lamp in front of the sample. The sample was then stretched anistropically by pulling it slowly (0.5 mm/minute) in one direction. Once the film was elongated by a factor of 8, the stretching was stopped and the stretched film froze in its new configuration. The mechanical stretching action directs the nanorods alignment preferentially along the stretch direction. This yields a stand-alone polymer film with preferably aligned nanorods emitting light polarized preferably along the alignment axis. The emission was measured and polarization values of the emission were extracted. Polarization ratio measured between emission parallel and perpendicular to the alignment axis was 2.4-3.3 depending on specific conditions. Higher values are achievable by more significant stretching.

For example, for a monochromatic display, CdS rods with a CdSe seed were applied (rods size 41×5.3 nm), emitting at 620 nm. For two color display, a mixture of two samples of CdS rods with CdSe seeds of different dimensions was applied. The first sample emitted at 630 nm (red rods, rods size 36×7 nm) and the second sample emitted at 550 nm (green rods, rods size 25×3 nm).

It is important to note in this context that the seeded rods used in this example offer low self absorbance of their emission. This is especially important in schemes where a DBEF film is used to re-circulate the unwanted polarized light multiple times until a higher polarization is achieved. Even a small self-absorbance can make the DBEF become inefficient. In addition, red emitting nanorods have very small absorbance in the green region compared with dots. This allows for better performance in films that contain nanorods with Green mixed with Red since the Red is excited only by the Blue or UV input. Thus, additionally characters of the nanorods enable such films to be superior to similar films prepared with regular quantum dots. Some features of such nanorods are disclosed in WO/2011/092646 assigned to the assignee of the present application, the disclosure of this publication being incorporated herein by reference with respect to some examples.

To construct the back light unit, the above optically active structure was placed on a blue emitting light source (emission around 450 nm, 20 mW, 2.4 candela). The concentration of the green and red rods was tuned to provide the needed color gamut, and could be used as a back light for a two color display. In another realization, the concentration was tuned to allow part of the blue light to be transferred through providing a full color display. The light after the active anisotropic nanoparticle layer was passed through a polarizer with its transfer axis parallel to the main alignment axis of the optically active structure. This was done to obtain more full polarization properties for the light. Importantly, the loss of light due to non-polarized light was minimal in this case providing high energy efficiency. Then the light was transferred to the liquid crystal modulator and the rest of the display.

Example 2

An optically active structure comprising stand-alone nanorods was prepared. The rods used were CdS rods with a CdSe seed, of dimensions 67×5 nm and emitting at 622 nm. The rods were aligned on a glass substrate or on polymer film. In a first method, nanorods were deposited on glass from solutions and were then aligned by a technique of rubbing by a velvet cloth. Alternatively, a solution of the rods was applied during the rubbing process. The velvet cloth directs the nanorods alignment preferentially along the direction of rubbing. This yields a layer with preferably aligned nanorods emitting light polarized preferably along the alignment axis. This could be used in a monochrome display.

A two-color back light unit for display that can be expanded to three color back light unit for display with the non-absorbed blue light emission passing through the film serving as the third color was demonstrated. A mixture of two samples of CdS rods with CdSe seeds of different dimensions was applied. A first sample emitting at 622 nm (red rods), and a second sample emitting at 540 nm (green rods) produce a combination whose emission shows two peaks. The polarization and directionality of the nanorods' emission was measured as well as described below:

The sample film with 622 nm emission was illuminated by a LED emitting in the blue region of the spectrum. The light emitted by this layer was passed through a filter in order to remove the transmitted blue light and isolate the emission. The intensity of the emission was then measured using a CCD. A polarizer allowed the measurement of both the total intensity as well as the intensity along the two polarizations, i.e. along the direction of the nanorods and in the orthogonal direction. The polarization ratio (PR) defined as the ratio of the light intensity with desired polarization to the light intensity in the orthogonal polarization was 3.3:1. When passed through a polarizer with axis in the same direction as the nanorods' long dimension, the emission of nanorods displayed 77% transmission compared with 50% for regular unpolarized light (disregarding the losses occurring in the polarizer itself). As expected for dipole-like emitters, the emission was found to be more concentrated in directions along axes lying within a small angle relative to a plane perpendicular to the alignment axis of the nanorods, and decreases in the direction of the tips of the nanorods, yet roughly uniform in the azimuthal direction within the horizontal plane. A theoretical model was devised in which it was assumed first that the nanorods are not perfectly ordered within the film, but rather are aligned along a distribution of directions characterized by a single parameter, SIGMA, the standard deviation for the distribution. Moreover, at an individual level, the nanorods were not assumed to emit as pure dipoles, which would translate into a (maximum) PR value of infinite for an individual rod. Rather prior measurements of nanorods in solution dictated a PR value of 6 for rods taken individually. Comparison with the theoretical analysis suggests that the rubbing achieves an alignment with a SIGMA value of 10 degrees. Variation with elevational angle (Theta) of Intensity of Light polarized parallel to long axis of nanorod 130 and the match to a numerical simulation 140 are displayed in FIG. 1D. Variation with azimuthal angle (Psi) of Intensity of Light polarized parallel to the long axis of the nanorods 150 and the corresponding match to a numerical simulation 160 are displayed in FIG. 1E.

As expected the emission was found to be stronger in the meridian plane, decreasing in the direction of the tips, yet roughly uniform in the azimuthal direction. Comparison with a theoretical analysis suggests that the rubbing achieves an alignment with a SIGMA of 10 degrees. The variation of the intensity and the polarization with the polar and azimuthal angles and the match to a numerical simulation are shown in FIGS. 1D and 1E.

To construct the back light unit, the above active anisotropic nanoparticle layer was placed on a blue emitting light source (emission around 460 nm). The concentration of the green and red rods was tuned to provide the needed color gamut, and could be used as a two color display. In another realization, the concentration was tuned to allow part of the blue light to be transferred through. The light after the optically active structure was passed through a polarizer with its transfer axis parallel to the main alignment axis of the optically active structure. This was done to obtain more full polarization properties for the light. Importantly, the loss of light due to non-polarized light was minimal in this case providing high energy efficiency. Then the light was transferred to the liquid crystal modulator and the rest of the display.

Example 3

An optically active structure comprising stand-alone nanorods was prepared. The rods were aligned on a glass substrate with patterned electrodes such as described in the above mentioned WO/2010/095140 assigned to the assignee of the present application. In this method, nanorods were deposited on the glass from solutions while applying an alternating electric field between the electrodes. During drying of the solution, the nanorods were preferentially aligned parallel to the direction of the applied electric field. This yields a layer with preferably aligned nanorods emitting light polarized preferably along the alignment axis. Typical values for the polarization ratio were between 2 to 4.7, where each color emitter can have a different polarization ratio value according to the specific type of nanorod used, and the nanorods deposition and alignment conditions. To construct the back light unit, the above active anisotropic nanoparticle layer was placed on a blue emitting light source (emission around 460 nm). The concentration of the green and red rods was tuned to provide the needed color gamut, and could be used as a two color display. In another realization, the concentration was tuned to allow part of the blue light to be transferred through. The light after the optically active structure was passed through a polarizer with its transfer axis parallel to the main alignment axis of the optically active structure. This was done to obtain more full polarization properties for the light. Importantly, the loss of light due to non-polarized light was minimal in this case providing high energy efficiency. Then the light was transferred to the liquid crystal modulator and the rest of the display.

Thus, the present invention provides a novel approach for polarized light sources using an optically active structure based on the homogeneously aligned nanorods along one or two axes to provide polarized light of various colors and/or orthogonal polarizations to a display/projector. Such approach is advantageous over known methods which direct backlight into a passive polarizer. Indeed, the invention provides for significantly improved energy efficiency due to the polarization of backlight, since the optically active structure of the invention emits polarized light and can thus increase the light transmitted by the polarizer by a factor of almost 2 for perfectly polarized light. The increase can be significant even for partially polarized light. For example, for 90% polarized light with the same axis as that of a liquid crystal first polarizer, the factor is ~1.8=90/50). This provides a cheap and effective solution that may equal or even surpass the performance of a DBEF film, which film is complex and expensive. Further, the invention provides for simplifying a backlight system structure; this is because the optically active structure emits already polarized light, and therefore it provides for achieving comparable and even better performance with fewer layers. This is related to an additional characteristic of the nanorods within the optically active structure, in that the emission intensity angular variation is similar to a dipole. Little light is emitted to the long axis direction and stronger emission is provided toward a direction perpendicular to the long axis direction. This allows a better use of light emitted for wanted directions. Moreover, the invention provides backlight systems with potential for a very large and flexible color gamut, since it is possible to place in the active anisotropic nanoparticle layer a combination of nanomaterials that emit at the desired base colors.

The invention claimed is:

1. An optically active structure comprising:
a plurality of optically active nanorods formed by the nanorods arranged in at least two groups differing from one another in at least one of wavelength, and axis of alignment and thereby polarization of light emitted therefrom in response to pumping light, such that the nanorods of the same group are homogeneously aligned with a certain first axis of alignment substantially parallel or substantially perpendicular to a second axis of alignment of the nanorods of at least one other group, such that said plurality of nanorods of said at least two groups have one or two axes of alignment being substantially parallel or substantially perpendicular to one another; and at least one light extracting feature configured to preserve said polarization of the emitted light.

2. The structure of claim 1, comprising the nanorods which emit light of substantially the same wavelength and are oriented along the two perpendicular axes of alignment thereby producing light of orthogonal polarizations.

3. The structure of claim 1, comprising at least one region thereof which contains a mixture of the homogeneously aligned nanorods of said at least two groups, and nanorods of said at least two groups being configured for emitting light of at least two different wavelengths, respectively.

4. The structure of claim 1, comprising at least one pair of spaced-apart regions, containing the nanorods of the two groups respectively.

5. The structure of claim 1, comprising an array of regions arranged along at least one axis in a spaced-apart relationship, each two adjacent regions aligned along said at least one axis containing the nanorods of the different groups.

6. The structure of claim 1, wherein said nanorods are arranged in at least one layer.

7. The structure of claim 1, wherein the nanorods are embedded in a carrier.

8. The structure of claim 1, wherein the nanorods are deposited on a substrate carrier.

9. The structure of claim 1, wherein the nanorods are made of one or more semiconductor materials.

10. The structure of claim 1, wherein the nanorods have an elongated geometry with an aspect ratio of at least 1.8.

11. The structure of claim 1, wherein the nanorods have a core-shell configuration.

12. The structure of claim 1, wherein the nanorods are configured as seeded rods.

13. A lighting device comprising the optically active structure of claim 1, and a pumping light source.

14. A lighting device configured as a colored display device comprising the optically active structure of claim 1, a pumping light source for exciting said optically active structure and a pixel arrangement exposed to light emitted by said optically active structure.

15. The structure of claim 1, wherein said at least one light extracting feature comprises at least one of reflective, diffusing and refractive structures or interfaces configured to preserve polarization of light passing therethrough.

16. The structure of claim 7, wherein the carrier is optically transparent for the pumping light and emitted light.

17. The structure of claim 7, wherein the carrier with the embedded nanorods has a thickness ranging between 10 micrometers and 1 millimeter.

18. The structure of claim 7, wherein said at least one light extracting feature comprises a light director interfacing with a side of said carrier and is configure to direct emitted light towards a desired direction.

19. The structure of claim 7, wherein said carrier is selected from at least one of polymer, epoxy, silicone, glass and a hybrid of silicone and epoxy.

20. The structure of claim 8, wherein the substrate carrier is optically transparent for the pumping light and emitted light.

21. The structure of claim 8, wherein the nanorods deposited on said substrate carrier form a layer of nanorods having a thickness ranging between 10 nanometers and 2 micrometer.

22. The structure of claim 12, wherein a seed in the seeded nanorod has a spherical or rod-like geometry.

23. The lighting device of claim 13, wherein the optically active structure is configured and operable as a back lighting unit.

24. The lighting device of claim 13, configured to direct the emitted light along a first general direction of propagation, the device comprising a light source of said pumping light defining a second general direction of propagation of the pumping light towards the optically active structure, wherein said second direction is along an axis intersecting with an axis defined by said first general direction of propagation of the output light.

25. The lighting device of claim 13, comprising at least one light deflecting surface located in an optical path of the light emitted by the optically active structure.

26. The lighting device of claim 13, comprising at least one light refracting surface located in an optical path of the light emitted by the optically active structure.

27. An optically active structure, comprising at least two different groups of optically active nanorods differing in at least wavelength of light emitted therefrom in response to the pumping light, said at least two groups of nanorods being located, respectively, in at least two layers spaced apart along a predetermined axis defined by general direction of propagation of emitted light, thereby forming a cascaded arrangement of the optically active structure; the nanorods of the same group being homogeneously aligned with a certain axis of alignment being substantially parallel or substantially perpendicular to an axis of alignment of the nanorods of at least one other group, such that the nanorods of said at least two groups have one or two axes of alignment.

28. The structure of claim 27, wherein said at least two groups of nanorods are arranged in said at least two layers such that the nanorods emitting light of relatively shorter wavelength of said at least two wavelengths of emitted light are located downstream of the nanorods emitting light of relatively longer wavelength, with respect to a direction of propagation of the pumping light.

29. An optically active structure comprising:
a plurality of optically active nanorods formed by nanorods of two groups, the nanorods of the same group being homogeneously aligned with an axis of alignment being substantially perpendicular to an axis of alignment of the nanorods of the other group thereby emitting orthogonally polarized light; and
at least one light extracting feature configured to preserve said polarization of the emitted light;
thereby providing said optically active structure emitting light of two orthogonally polarizations.

30. The structure of claim 29, wherein the nanorods comprise nanorods emitting light of at least two different wavelengths.

31. The structure of claim 29, wherein said two groups of nanorods are located in at least two spaced-apart regions, such that each region comprises the nanorods of one group and is adjacent to at least one region comprising the nanorods of the other group.

32. An optically active structure comprising:
a plurality of optically active nanorods formed by at least two groups of the nanorods differing from one another in a wavelength of light emitted therefrom in response to pumping light, said plurality of optically active nanorods being a plurality of nanorods homogeneously oriented along a common axis of alignment; and at least one light extracting feature configured to preserve said polarization of the emitted light;

said optically active structure thereby emits substantially polarized light of at least two different wavelengths in response to said pumping light.

\* \* \* \* \*